Dec. 1, 1970 D. J. BORODIN 3,543,609
WORK TRANSFER MECHANISM WITH MEANS FOR CONTROLLING ACCELERATION
AND DECELERATION AT PREDETERMINED RATES
Original Filed Sept. 16, 1964 14 Sheets-Sheet 1

INVENTOR.
DANIEL J. BORODIN

BY
Barnes, Kisselle, Raisch & Choate
Attorneys

INVENTOR.
DANIEL J. BORODIN

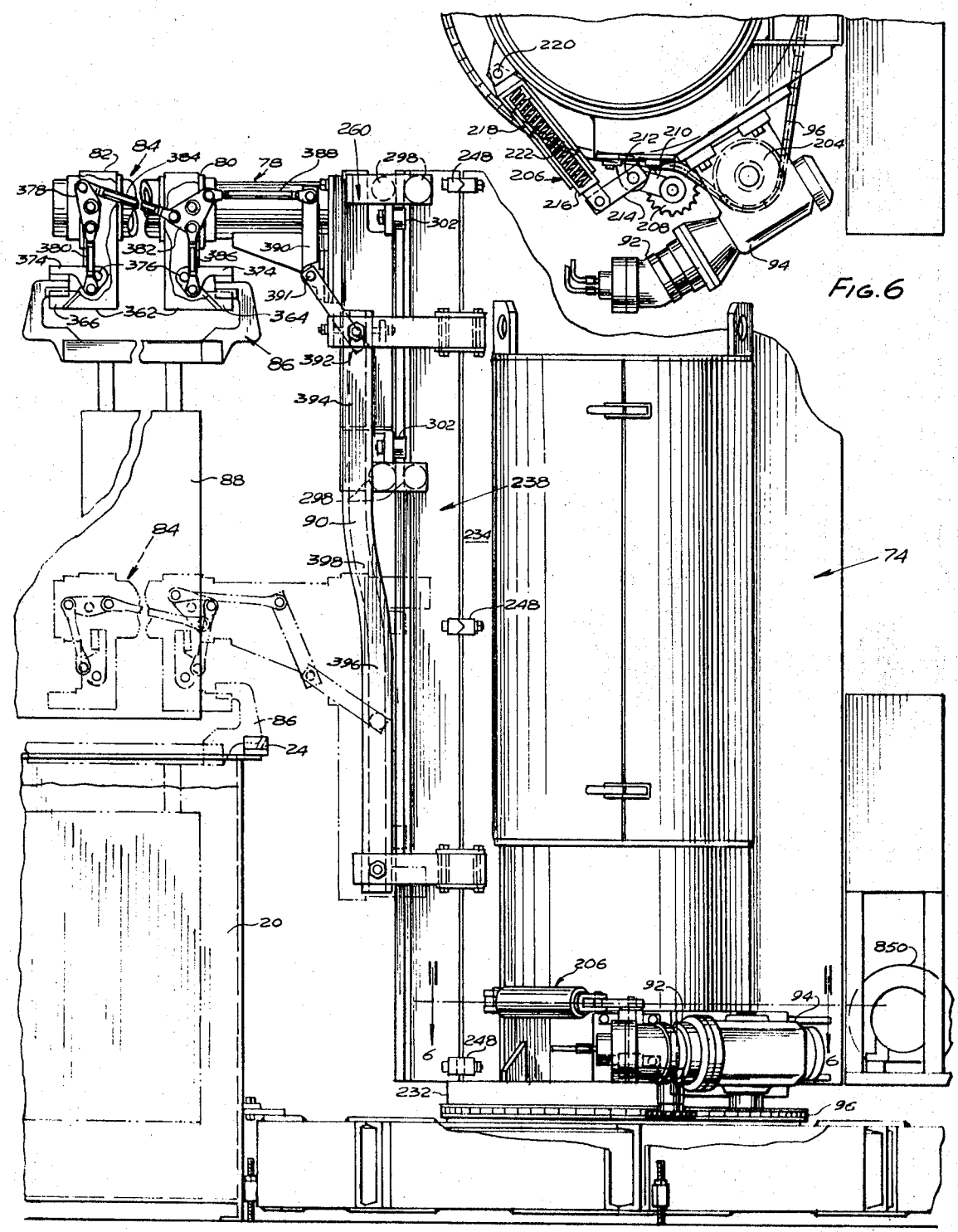

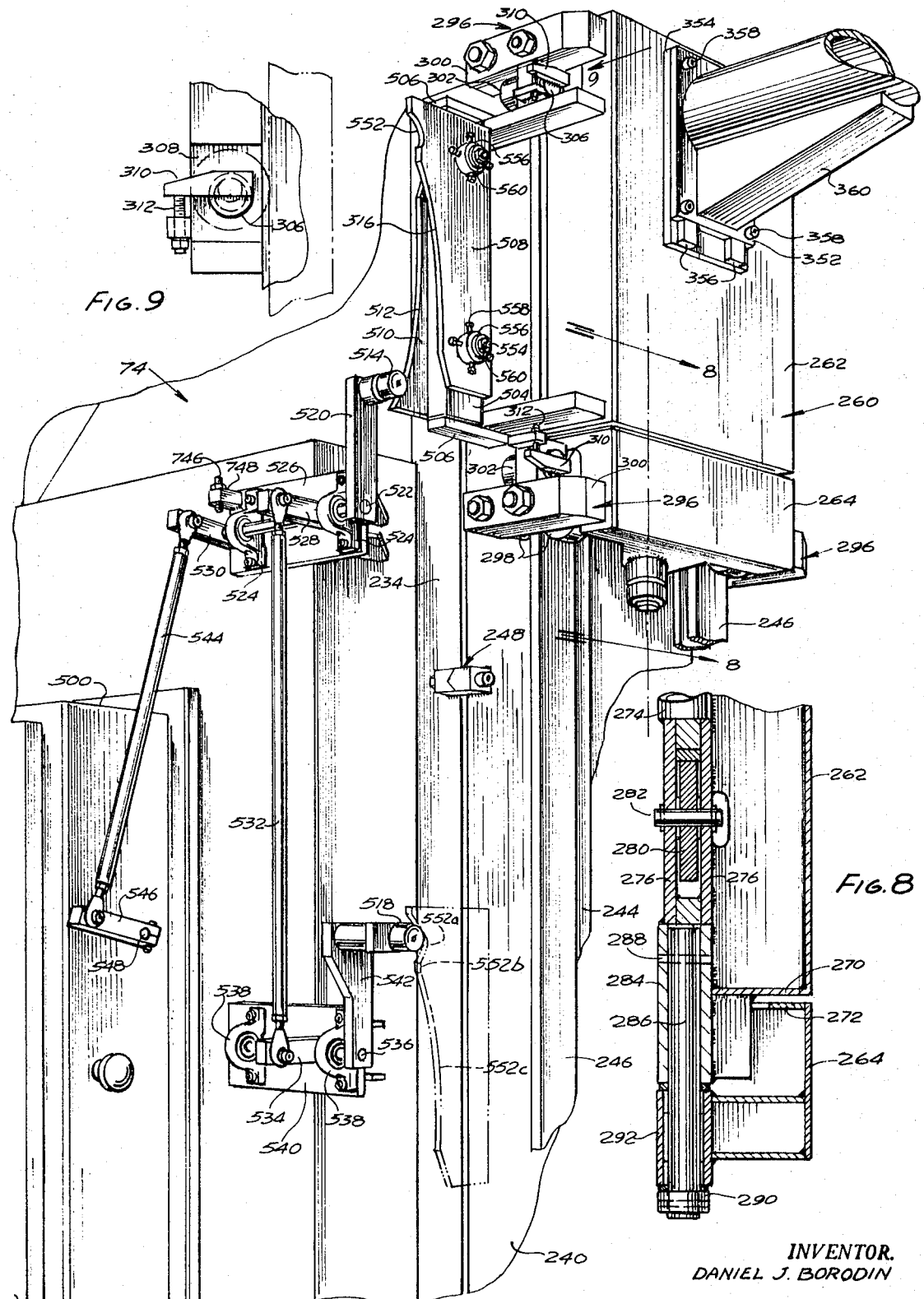

INVENTOR.
DANIEL J. BORODIN

Dec. 1, 1970                 D. J. BORODIN                 3,543,609
WORK TRANSFER MECHANISM WITH MEANS FOR CONTROLLING ACCELERATION
AND DECELERATION AT PREDETERMINED RATES
Original Filed Sept. 16, 1964                       14 Sheets-Sheet 7

INVENTOR.
DANIEL J. BORODIN
BY
Barnes, Kisselle, Raisch &
Choate
Attorneys

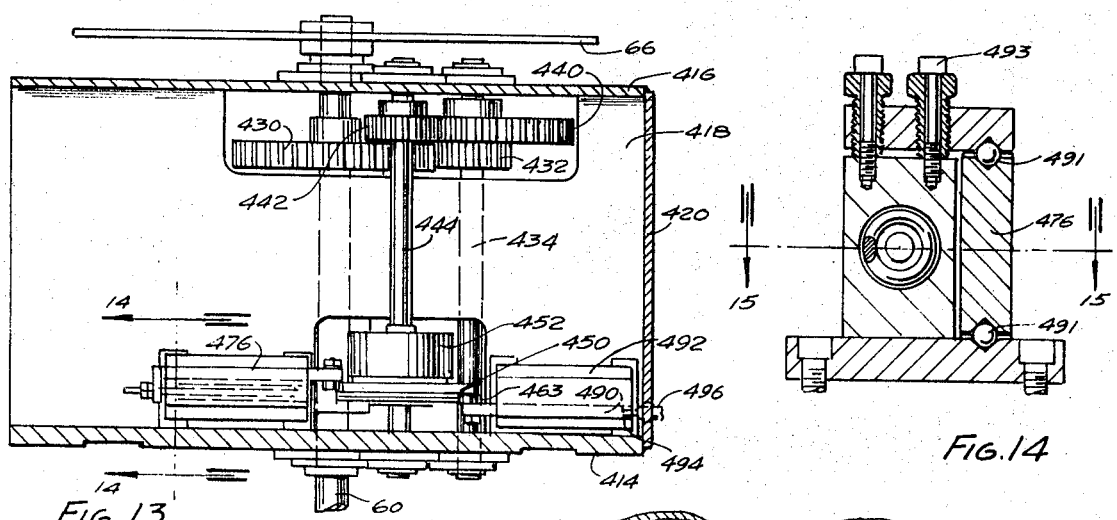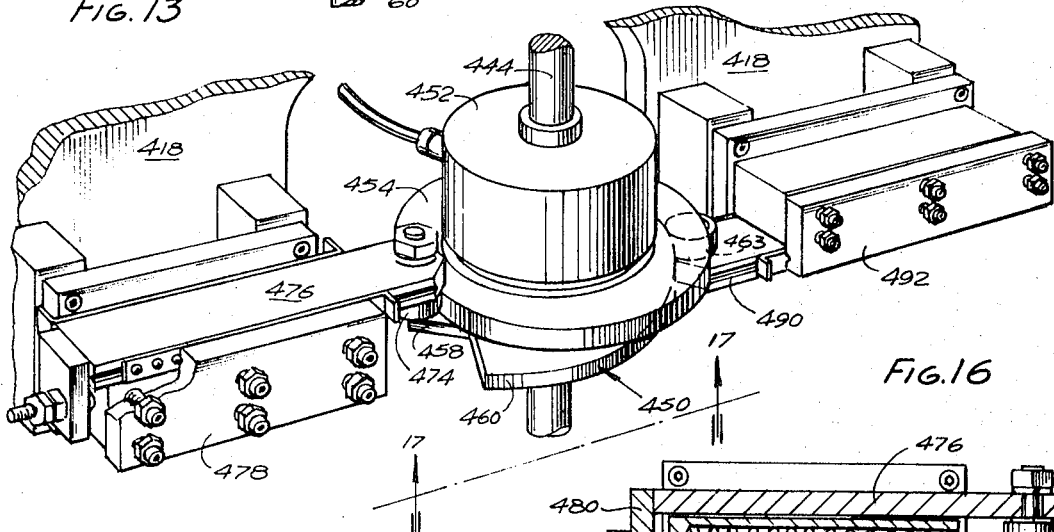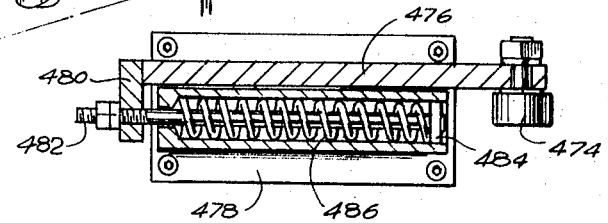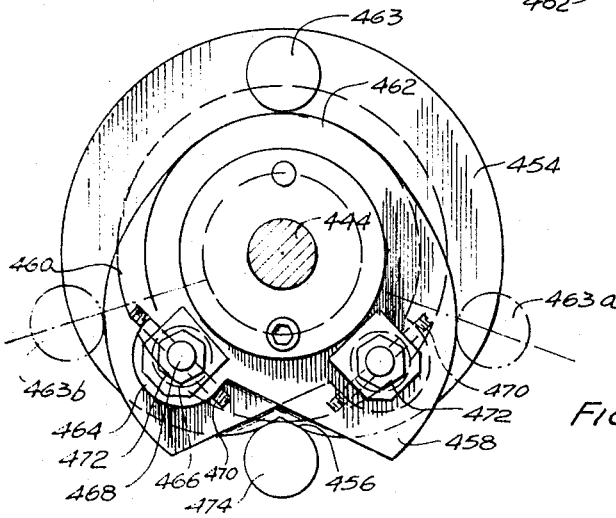

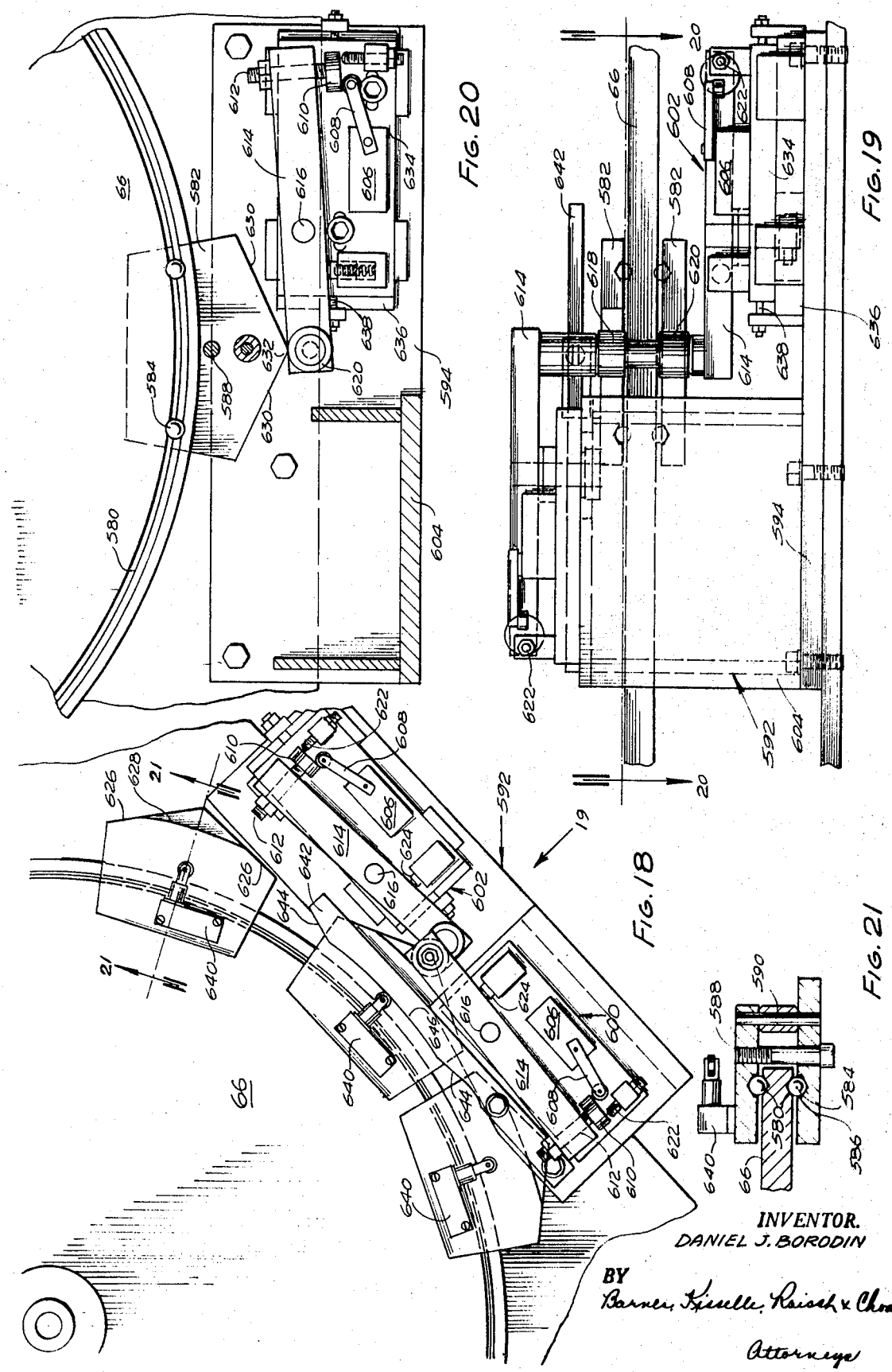

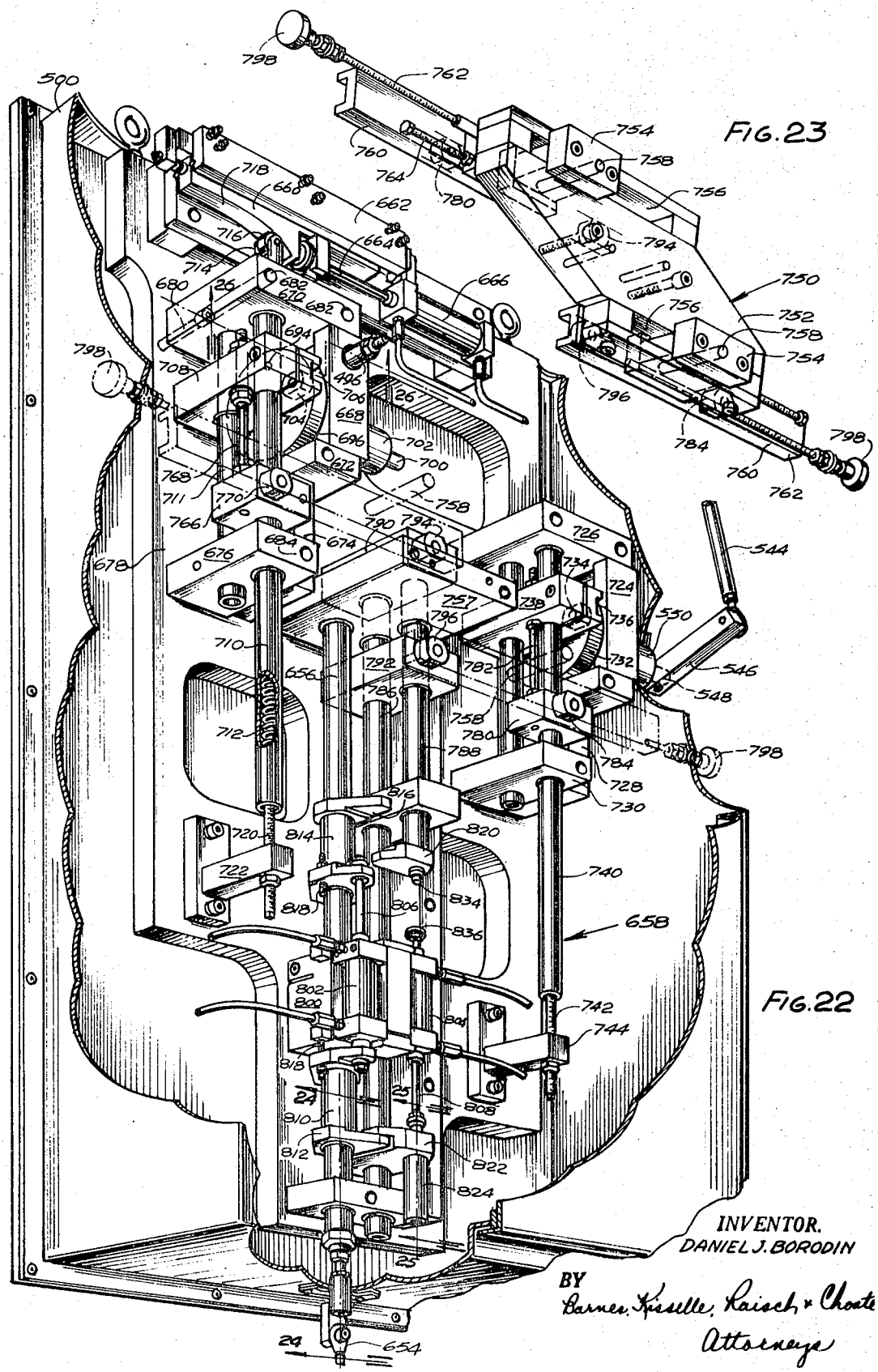

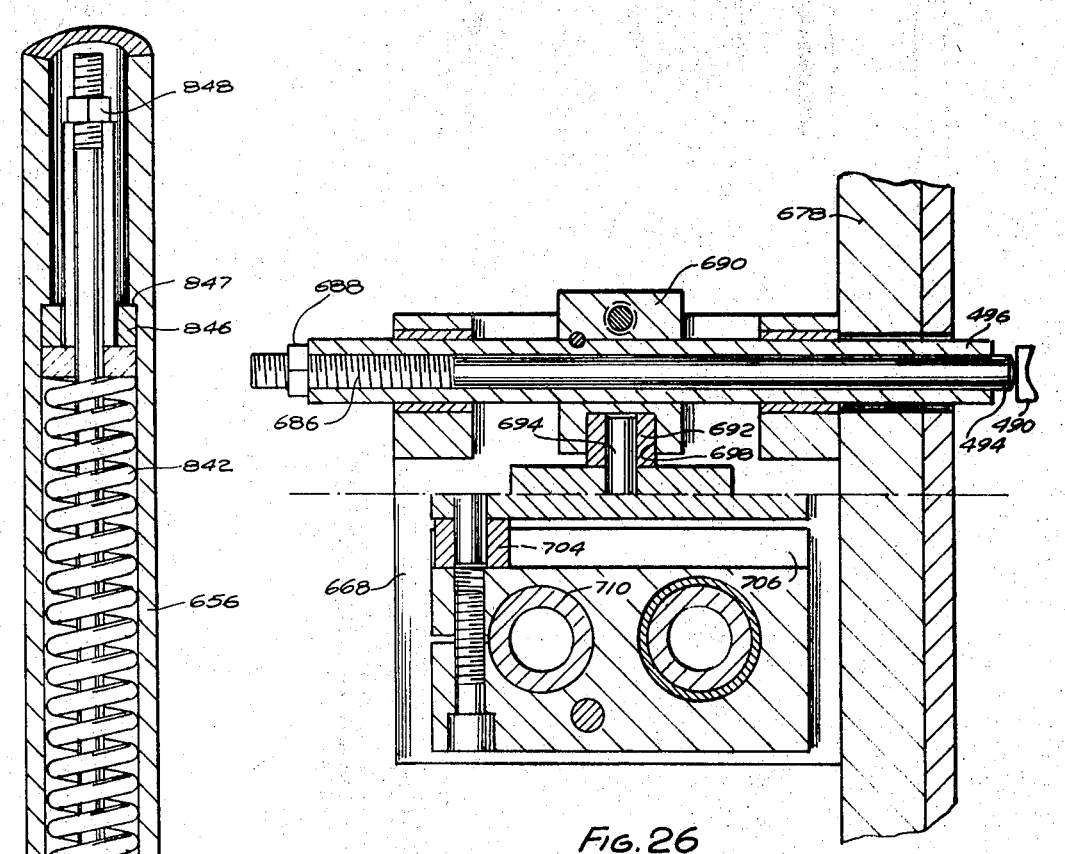
Fig. 24
Fig. 26
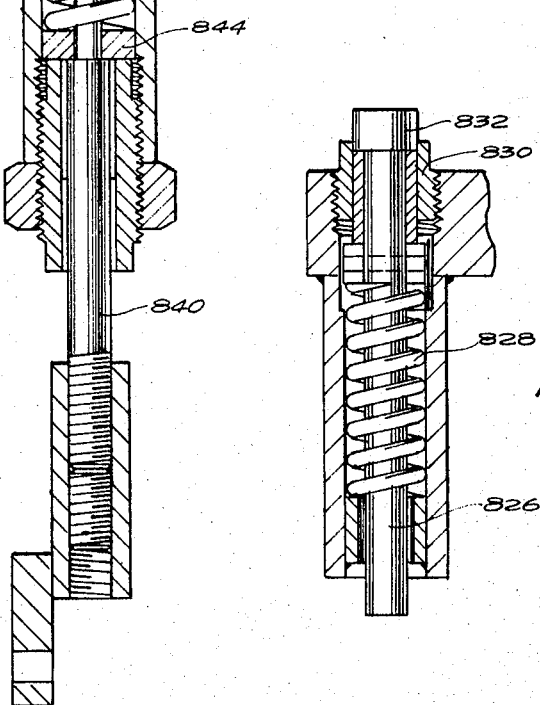
Fig. 25

INVENTOR.
DANIEL J. BORODIN

Dec. 1, 1970  D. J. BORODIN  3,543,609
WORK TRANSFER MECHANISM WITH MEANS FOR CONTROLLING ACCELERATION
AND DECELERATION AT PREDETERMINED RATES
Original Filed Sept. 16, 1964  14 Sheets-Sheet 14
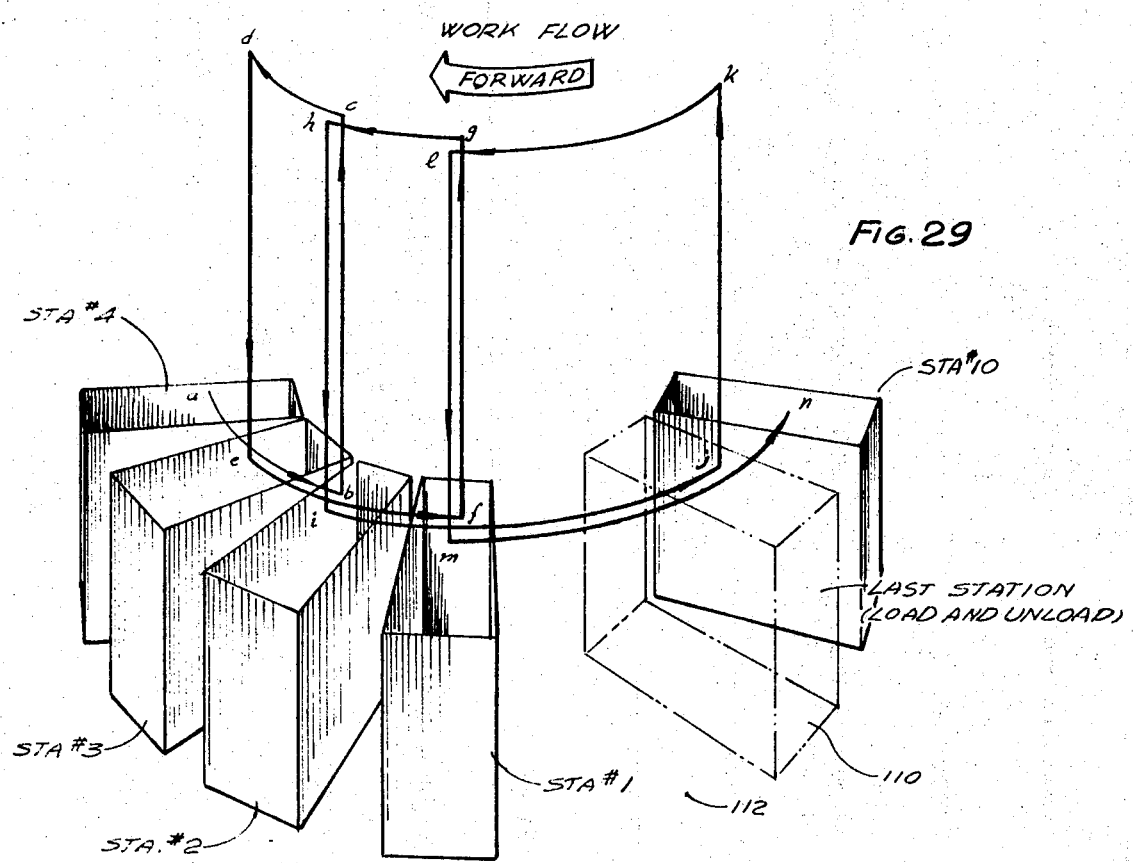
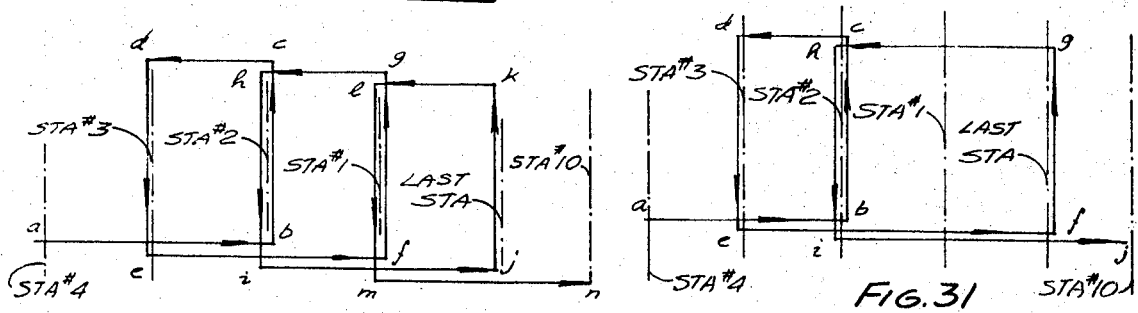
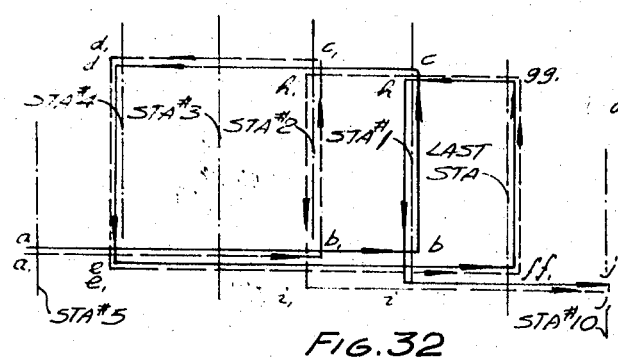
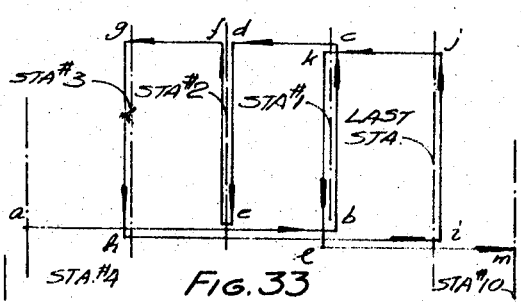
INVENTOR.
DANIEL J. BORODIN
BY
Barnes, Kisselle, Raisch & Choate
Attorneys

United States Patent Office 3,543,609
Patented Dec. 1, 1970

---

3,543,609
WORK TRANSFER MECHANISM WITH MEANS FOR CONTROLLING ACCELERATION AND DECELERATION AT PREDETERMINED RATES
Daniel J. Borodin, Detroit, Mich., assignor to U.S. Automation Company, Detroit, Mich., a corporation of Michigan
Continuation of application Ser. No. 649,759, May 8, 1967, which is a continuation of application Ser. No. 396,822, Sept. 16, 1964. This application Aug. 30, 1968, Ser. No. 767,887
Int. Cl. B17q 17/00
U.S. Cl. 74—818                         50 Claims

ABSTRACT OF THE DISCLOSURE

A work transfer mechanism embodying a base provided with a plurality of stations and a carriage movable on the base for traversing the stations, the carriage being driven by a variable speed motor unit. Means are provided for accelerating and decelerating the carriage travel at predetermined rates. The decelerating means are adapted to reduce the carriage velocity to zero when the carriage arrives at a predetermined station and includes a switch mechanism located on the base at a predetermined distance in advance of a station for triggering the carriage decelerating mechanism when the carriage traverses the switch mechanism so that, when the carriage arrives at the station, its velocity will be zero.

---

This application is a continuation of my prior co-pending application Ser. No. 649,759, filed May 8, 1967, now abandoned, which application was a continuation of my prior application Ser. No. 396,822, filed Sept. 16, 1964, now abandoned.

This invention relates to a material-handling mechanism, and more particularly a material-handling machine of the programmed or automated type.

In many processing industries, the plating industry, for example, automated material-handling machines are in common use. These machines are adapted to automatically transfer a workpiece through a plurality of processing stations so that a desired sequence of operations are performed on the workpiece. For the most part, such machines now in use present a variety of drawbacks or disadvantages. The high cost of such machines and limited flexibility thereof, in many instances, prohibits their use for many desirable applications and renders them out of economic reach of many prospective users. If the machine is of the type wherein the workpiece-elevating mechanism is designed to raise and lower workpieces at numerous stations simultaneously, then the machine, and particularly the elevating mechanism, tends to be unwieldy and requires a great deal of power to operate it. Furthermore, in automated work-handling machines of the type wherein a multiplicity of workpieces are suspended on racks which are transferred from one station to another, the speed of operation of the machine is usually controlled to a rather slow rate to prevent the workpieces from falling off the racks upon acceleration and deceleration of the rack-carrier arms on the machine, and particularly when the indexing motion of the carriage is arrested by engaging a positive stop.

The primary object of the present invention is to eliminate the problems referred to above by providing a machine which is less costly than standard automated work-handling machines, incorporates a carriage having a single work-supporting arm or boom for transferring workpieces from one station to another and operates at a relatively rapid velocity, but decelerates smoothly to stop at an accurately located position.

One form of machine according to the present invention is characterized by stations arranged in a generally circular fashion and by a work-indexing and elevating mechanism comprising a carriage mounted to rotate at the axis of the circle defined by the tanks and having a single radially extending boom that is designed to sweep radially over the stations and to raise and lower, so that the single boom serves as the sole means for transferring workpieces from one station to another.

The use of a single boom enables handling of a substantially larger rack sizes and and rack loads with the same or less power than machines having a plurality of rack support arms. Thus a great variety of sizes and shapes of workpieces can be accommodated by a single relatively small machine. While the use of a single boom for transferring the work through the required number of stations necessarily involves a longer cycle, this is compensated for by the much higher load capacity of a single boom as distinguished from a plurality of lighter capacity booms. The entire load of the machine can be concentrated on a single boom rather than being distributed along a plurality of booms.

The machine of the present invention is also characterized by provision of analog velocity controls for the indexing motion and the elevating motion of the work-supporting boom. The analog controls are designed to produce an infinitely variable velocity and at the same time an optimum acceleration and deceleration for both the carriage and elevator, so that the time requirements for a complete cycle are reduced to a minimum without encountering the problem of workpieces being jarred off the work-supporting racks.

The machine also embodies a novel transducer mechanism which is of relatively simple construction and which enables relatively simple adjustment to insure that the work-supporting boom, when indexed, will stop precisely at the center line of a station.

Another important feature of the machine of this invention resides in an elevating structure of relatively simple but rigid construction designed to be fabricated economically and which at the same time operates very smoothly and accurately on a vertical guide structure. The elevator structures includes a work-supporting boom with a novel clamping mechanism which is operated automatically in response to the vertical motion of the elevator, to securely clamp the carrier arm of a work rack in a manner such that the work rack remains relatively rigid at all times and enables the boom to travel at a relatively high velocity without the danger of workpieces being jarred off the rack or the racks catching on the edges of the tanks due to pendulum action.

Another feature of the machine resides in its ability to advance workpieces through a series of stations in a novel manner. More specifically, a machine according to the present invention advances workpieces from one station to the next successive station by moving the carriage forward one station to deposit work at an empty station and then moving rearwardly two stations to pick up work and deposit it in the station just emptied.

Other features and advantages of the machine will become apparent from the following description and drawings, in which:

FIG. 5 is a fragmentary side elevational view of the side of the machine opposite to that shown in FIG. 4 with parts broken away.

FIG. 6 is a sectional view of the drive mechanism for the carriage, taken along the line 6—6 of FIG. 5.

FIG. 7 is a fragmentary perspective view of a portion of the machine showing the elevator and related velocity control structure.

FIG. 8 is a sectional view taken along the line 8—8 in FIG. 7.

FIG. 9 is a detailed sectional view showing the roller adjusting arrangement on the elevator and taken along the line 9—9 in FIG. 7.

FIG. 13 is a sectional view taken along the line 13—13 in FIG. 12 with portions removed.

FIG. 14 is a sectional view taken along the line 14—14 in FIG. 13.

FIG. 15 is a sectional view taken along the line 15—15 in FIG. 14.

FIG. 16 is a fragmentary perspective view of the clutch mechanism and the carriage decelerating cam assembly.

FIG. 17 is a view of the clutch and cam assembly taken along the line 17—17 in FIG. 16.

FIG. 18 is a fragmentary sectional view taken along the line 18—18 in FIG. 11 and showing the transducer mechanism.

FIG. 19 is a fragmentary side elevational view of the transducer mechanism, as seen in the direction of the arrow 19 in FIG. 18.

FIG. 20 is a sectional view along the line 20—20 in FIG. 19.

FIG. 21 is a sectional view along the line 21—21 in FIG. 18.

FIG. 22 is a perspective view of the analog velocity control arrangement with parts removed therefrom.

FIG. 23 is a perspective view of the factoring mechanism removed from the control arrangement shown in FIG. 22.

FIG. 24 is a sectional view along the line 24—24 in FIG. 22.

FIG. 25 is a sectional view along the line 25—25 in FIG. 22.

FIG. 26 is a sectional view along the line 26—26 in FIG. 22.

FIG. 29 is a diagrammatic perspective view illustrating the basic machine motion.

FIGS. 30, 31, 32 and 33 show in a linear fashion four typical motion patterns for the machine.

GENERAL ARRANGEMENT

Figure 1:
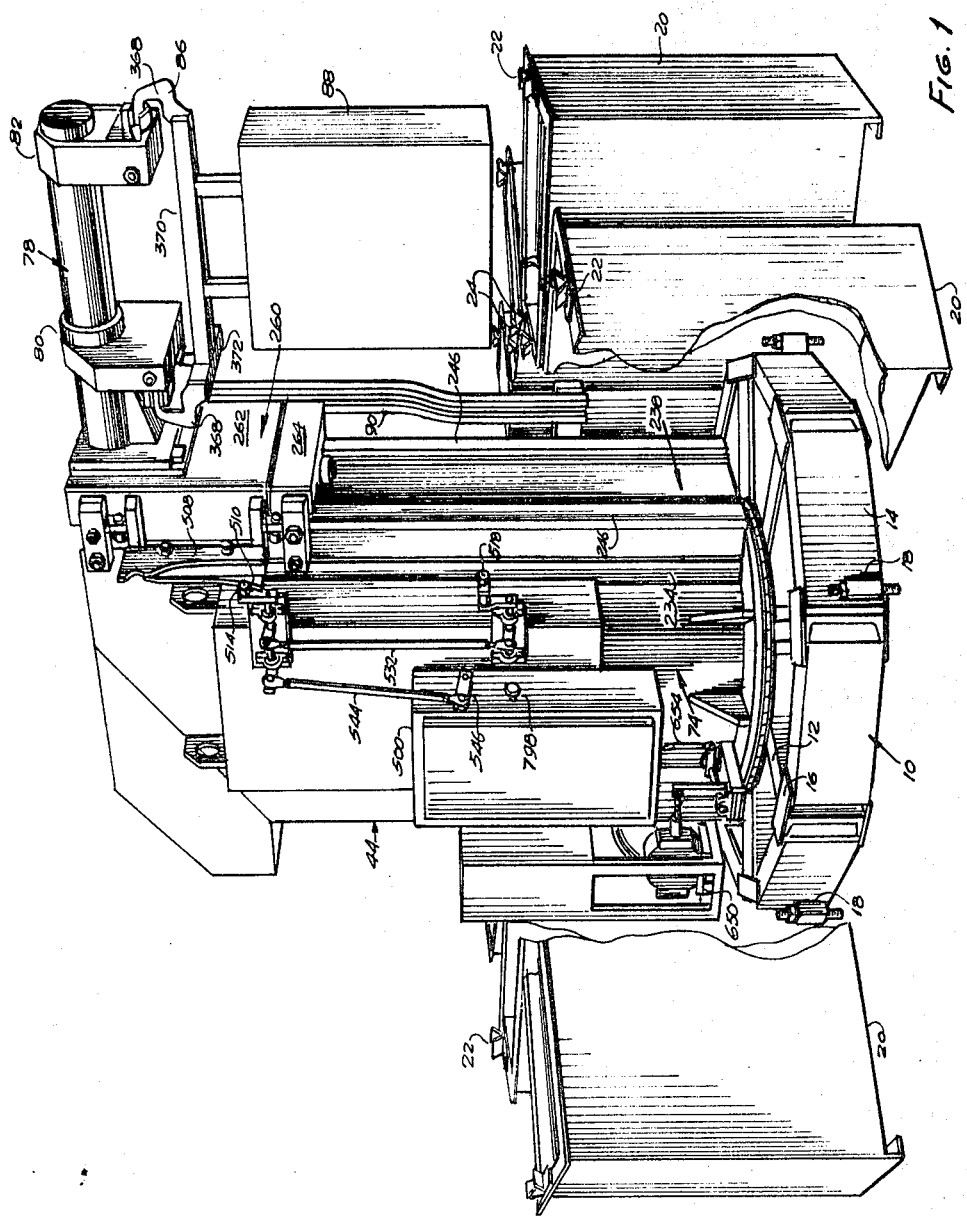
FIG. 1 is a perspective view of a circular or dial type of material-handling machine embodying the present invention.

Referring to FIGS. 1 through 5, the material-handling mechanism of this invention is illustrated for the purposes of description as dial type automatic plating machine. Numerous features of the invention however may be incorporated in linear type machines and machines for processes other than plating. The particular machine illustrated includes a base 10 formed of a plurality of radially extending channel members 12 which are interconnected at their outer ends by channel members 14 and reinforced by gusset plates 16. Base 10 has mounted thereon a plurality of leveling screws 18. A plurality of plating tanks 20 are arranged circumferentially around base 10. Tanks 20 extend radially outwardly from around base 10, and each tank is provided with a centrally located V-shaped saddle 22 at the outer side thereof and with two similarly shaped saddles 24 at the inner side thereof.

Figures 2, 3:
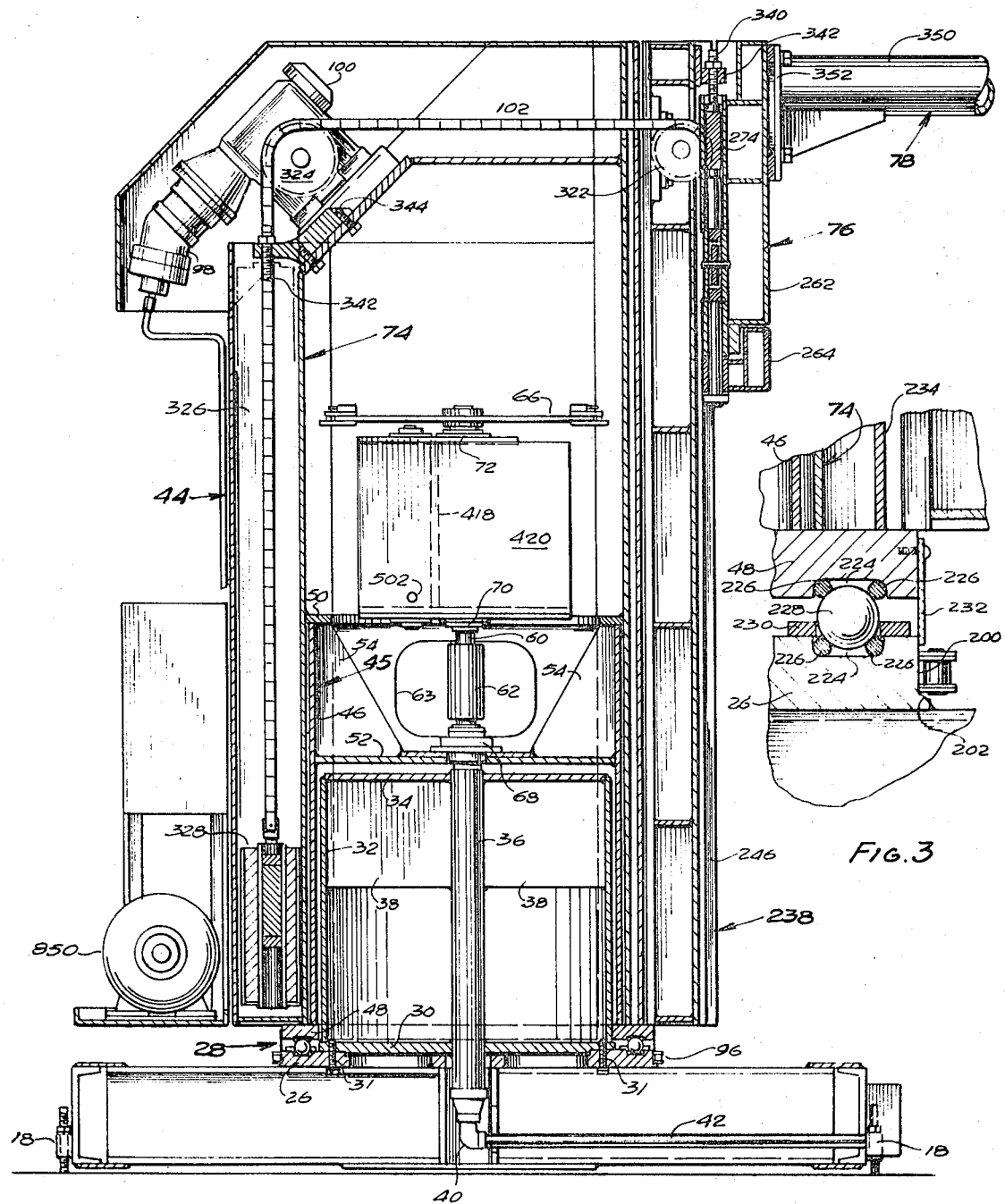
FIG. 2 is a vertical sectional view of the machine illustrated in FIG. 1.
FIG. 3 is an enlarged detailed view of a portion of the bearing structure shown in FIG. 2.

Referring particularly to FIGS. 2 and 3, there is mounted on the top face of base 10 a machined steel ring 26 which forms the lower race of a ball bearing assembly 28. A central bottom plate 30 closes the central opening of ring 26, and is secured thereto by a plurality of screws 31. Plate 30 forms the base of a stationary column 32 on base 10, which is closed at its upper end by a cover plate 34. An upstanding pipe 36 extends upwardly through column 32 and is welded to the base plate 30 and the cover plate 34. This column assembly is reinforced by radially extending plates 38 which are welded to the pipe 36 at their inner edges and to the column 32 at their outer ends. The lower end of pipe 36 is connected by an elbow 40 to a pipe 42 which extends radially out through one side of the base 10 and provides a means for extending wires upwardly through the center of the machine.

The rotating structural assembly of the machine, generally designated 44 and referred to as the carriage, is mounted on a hollow frame 45 consisting of a cylindrical support 46 welded at its lower end to the upper race 48 of bearing 28 and having a ring 50 welded to the upper end thereof. Within cylindrical support 46 there is welded a bearing support plate 52 which is spaced slightly above cover plate 34. Frame 45 is reinforced by a plurality of radially extending plates 54, which are welded to the plate 52 at their lower ends and to the ring 50 at their upper ends.

Pipe 36 has an extension 60 connected thereto by a flexible coupling 62. The side wall of support 46 is apertured at 63 to permit access to coupling 62. Extension 60 extends upwardly through a collector ring assembly 64 (FIG. 11), and has fixedly secured thereto at its upper end a stationary transducer disc 66. Pipe 36 and its extension 60 extend upwardly through three self-aligning bearings 68, 70 and 72 on the rotating structure of the machine. The hollow frame 45 has a structural shell 74 welded thereto, the shell 74 forming an enclosure for internal mechanisms of the machine.

At one side of shell 74 there is mounted for vertical movement an elevator assembly 76 on which is mounted a boom structure 78. Referring to FIGS. 1 and 5, boom 78 includes an inner head 80 and an outer head 82, and these heads have a clamp mechanism 84 associated therewith and adapted to grip a work carrier 86 which supports a plating rack 88 on which workpieces to be plated are clamped or suspended in some suitable manner. The clamp mechanism 84 is actuated to open and close in response to vertical movement of elevator 76 by means of a cam track 90.

Carriage 44 is rotated by a hydraulic motor 92 through a gear reducer 94 and a chain 96. The elevator assembly 76 is driven by a hydraulic motor 98 through a gear reducer 100 and a chain 102 (FIG. 2).

The material handling machine of this invention is designed to be operated in a particular sequence of operations by a programming mechanism of any suitable type. For example, the programming mechanism can be in the form of an electronic logic system or a tape system of suitable design. The programming mechanism, hereinafter referred to as the logic, forms no part of the present invention, and is therefore not described. It is sufficient to say that the logic is adapted to index the carriage to the various stations provided by the tanks 20 in any order or sequence desired and to operate the elevator mechanism 76 so that the desired sequence of operations on the workpieces being plated is achieved.

MACHINE CYCLE

In order to understand more clearly the functioning of various mechanisms of the machine, it is advisable to describe generally several types of motion patterns that can be executed by the machine under the control of the logic mechanism. In this connection, reference is made to FIGS. 28 to 33. Generally speaking, the machine is designed to pick up a rack on which the workpieces are supported from a load and unload station, designated 110 in FIG. 28, and advance the rack in a clockwise direction, as viewed in FIG. 28, through all or at least the selected stations, so that when the cycle is complete the rack is again deposited at the load and unload station 110. In the tank arrangement illustrated, there is a gap 112 between the load and unload station 110 and station 1 to permit access to a rack located at the load and unload station. It should be understood that although the boom is designed to operate on a single rack or a single group of racks in any particular instant, nevertheless, depending on the sequence of operations, a plurality of racks are located at the various stations at all times, and the racks are individually progressed through the machine in succession. With the machine of the present invention, the number of racks 88 being processed at any one time may equal the number of the stations in the machine less one.

Referring now to FIGS. 29 and 30, there is diagrammatically illustrated a simplified development of the basic machine motion wherein the racks are progressively advanced from one station to the next adjacent station. As a starting point for the description, let us assume that a work rack has just been transferred from Station 3 to Station 4, in which case the boom 78 is in the lowered position at the center line of Station 4, where it has just deposited a work rack. This position is designated $a$ in FIGS. 29 and 30. If the logic of the machine is set to advance the work rack progressively one station at a time around the machine, the boom then indexes in a counter-clockwise direction from position to a position $b$ at Station 2. At Station 2 the boom rises to pick up the rack at this station and elevates it to position $c$. The boom then indexes horizontally in a clockwise direction to position $d$ at the center line of Station 3, then lowers to position $e$ to deposit the rack picked up at Station 2 into the tank at Station 3. The boom then again indexes in a counter-clockwise direction to position $f$ at Station 1, rises to position $g$ to elevate the rack located at Station 1 and then indexes horizontally in a clockwise direction to position $h$ at Station 2. The boom then descends to position $i$ to deposit the rack picked up from Station 1 into the tank at Station 2 and then indexes horizontally in a clockwise direction to position $j$ at the center line of the load and the unload station 110 where there would be located a rack loaded with workpieces ready to be processed. The boom would then rise to the position $k$ to pick up the load rack and index horizontally in a clockwise direction to position $l$ over the tank at Station 1. The boom would then descend to position $m$ to deposit the loaded work rack in the tank at Station 1.

Figure 28:
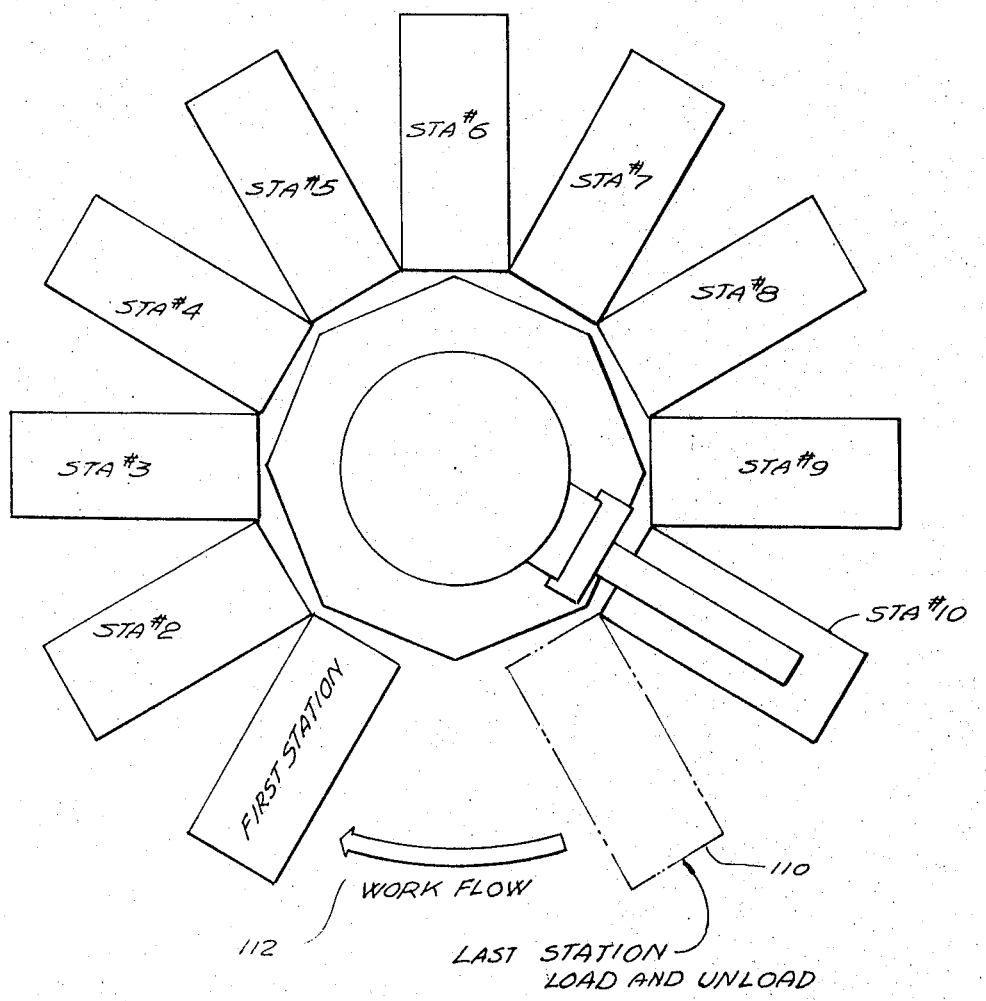
FIG. 28 is a diagrammatic plan view of the machine showing the arrangement of the various stations.

After depositing the loaded work rack into the tank at Station 1, position $m$, the boom indexes horizontally in a counter-clockwise direction to position $n$, where it would be located at the center line of the tank at Station 10, the position at which the boom is illustrated in FIG. 28. This would be the last station at which the workpieces are processed and the boom would pick up the rack of processed parts from Station 10 and deposit it at the unload station designated 110. In this fashion, all the work-loaded racks would be advanced progressively through the successive stations around the machine.

FIG. 31 diagrammatically illustrates the path of travel of the boom when the work is transferred directly from the load station, designated 110, into the tank at Station 2, the tank at Station 1 being a "skipped" station. In this pattern of motion, it will be observed that after the boom deposits the rack picked up from Station 2 into Station 3 at position $e$, it indexes horizontally in a counter-clockwise direction under control of the logic mechanism to position $f$, which in this case would be located at the center line of the load and the unload station 110. It would then pick up the loaded rack and transfer it vertically to position $g$ and then horizontally in a clockwise direction to position $c$, skipping Station 1 and depositing it directly into the tank at Station 2, position $b$. In this manner, one or more stations could be skipped.

In some plating cycles or other work-treating processes, it is necessary that the work be located at one or more particular stations for a longer period of time than is necessary at other stations. With the machine of the present invention, this sequence of operations is accomplished by providing a multiplicity of successive stations in which the workpieces are deposited for an interval of time corresponding to a multiple of the time interval during which the workpieces are deposited at other stations. For example, in the motion pattern illustrated in FIG. 32. Stations 1, 2 and 3 form the "cell plating" section of the machine. For a clear understanding of this type of motion, let us assume that the boom has picked up a rack from Station 4 and deposited it at Station 5, at the point $a$. The boom then indexes horizontally in a counter-clockwise direction to the point $b$ at Station 1. It picks up the rack at Station 1, raises it to the point $c$, and then indexes horizontally in a counter-clockwise direction to the point $d$ at Station 4. The boom descends, depositing the rack at position $e$, Station 4, and then indexes horizontally in a clockwise direction to the load station at the point $f$, where it picks up a rack, raises it to the point $g$, and then indexes clockwise to point $h$. It then deposits the rack in the tank at Station 1. The boom then indexes counter-clockwise to position $j$ at Station 10, picks up the rack at Station 10 and deposits it at the unload station. The boom progresses in a counter-clockwise direction around the machine until it again removes a rack from Station 4 and deposits it in Station 5 at the point designated $a_1$. The boom then indexes counter-clockwise to the position $b_1$ at Station 2, picks up the rack at this station, elevates it to position $c_1$, then indexes horizontally clockwise to the position $d_1$ and deposits the rack which it picked up from Station 2 into the tank at Station 4, position $e_1$. The boom then indexes counter-clockwise to the position $f$ at the load station, picks up another loaded rack, elevates it to the position $g_1$, and then indexes counter-clockwise to a position over Station 2, at $h_1$. The boom then lowers the rack to the position $i_1$ at Station 2 and thereafter indexes horizontally in a counter-clockwise direction to position $j_1$ at Station 10. In the same manner, the next cycle of the machine, after the boom transfers a rack from Station 4 to Station 5, picks up a rack from Station 3, deposits it at Station 4, and thereafter picks up the next rack at the load station and deposits it at Station 3. Thus the racks at Stations 1, 2 and 3 are caused to remain in the tanks at these stations three times as long as the racks remain in the tanks at the other stations.

As distinguished from a prolonged immersion or processing at a particular station, some plating processes or other processes require the workpieces to be treated for a much shorter period of time at one station than at other stations. The motion pattern for the boom of the machine in a sequence of operations that involves a short immersion time at one station is illustrated in FIG. 33. In this showing it is assumed that the workpieces are to be immersed in the tank at Station 2 for a shorter dwell-period than is the case at the other tanks. Thus, the boom indexes horizontally in a counter-clockwise direction from the position $a$ at Station 4 to the position $b$ at Station 1. It picks up the rack at Station 1, elevates it to position $c$, then indexes horizontally in a clockwise direction to position $d$ at Station 2. Thereafter the boom descends to deposit the rack in the tank at Station 2, position $e$, and remains there for the required length of time. After the required short interval of immersion has elapsed, the boom rises from position $e$ to position $f$.

Actually position *f* corresponds to position *d*, but these two paths of movement are shown spaced apart in FIG. 33 to more clearly illustrate the motion pattern. The boom then indexes horizontally in a clockwise direction to position *g* and then lowers the rack into the tank at Station 3, position *h*. Thereafter the boom indexes horizontally in a counter-clockwise direction to pick up a loaded rack at the load station at position *i*, elevate it to position *j*, and then indexes horizontally in a clockwise direction to position *k*. Thereafter it deposits the rack in the tank at Station 1, position *l*, and thereafter indexes horizontally in a counter-clockwise direction to position *m*, where it picks up a rack from Station 10.

The above motion patterns are typical of those that can be executed by the machine of the present invention simply by providing a logic mechanism designed to control the indexing and elevating motions of the boom in the manner described. In each instance it will be observed that the work progresses through the machine in one direction, while the boom in effect is advancing in the opposite direction. This is one characteristic feature of the machine of the present invention. It will be appreciated that the same motion patterns can be produced even if the carriage-supported boom travels in a linear, rather than a circular, path.

It must be understood that a very wide variation of desired immersion or processing intervals of time can be attained at various stations of the machine by making various combinations of the above described basic patterns of motion.

With this understanding of the basic motion pattern of the machine a detailed description of the various machine components and mechanisms is in order.

CARRIAGE INDEXING DRIVE MECHANISM

Referring particularly to FIGS. 2, 3, 5 and 6, the bottom race 26 of the carriage support bearing 28 is formed around its outer periphery with a cylindrical surface 200 which terminates at its lower end in an inclined shoulder 202. The drive chain 96 wraps around the cylindrical surface 200 and rests upon the shoulder 202. Gear reducer 94 is bolted at one side of the structural shell 74 and the output shaft thereof has keyed thereto a sprocket 204 around which chain 96 extends. The carriage is rotatably indexed by reason of the fact that chain 96 tightly grips the outer cylindrical surface 200 of race 26 while the sprocket 204 drives itself around the chain. It is therefore essential that chain 96 grips the cylindrical surface 200 tightly, and to accomplish this a chain tensioning assembly 206 is provided. The chain tensioning assembly 206 includes an idler sprocket 208 journalled on the end of a crank arm 210 keyed to a pivot shaft 212. A second crank arm 214 is also keyed to shaft 212 and its free end is connected with the end of a sleeve 216 telescoped within an outer sleeve 218. Sleeve 218 is pivotally mounted on shell 74 as at 220 and within the two sleeves there is arranged a compression spring 222. Spring 222 biases crank arms 210 and 214 in a counter-clockwise direction, as viewed in FIG. 6, and thus tends to tightly wrap chain 96 around the cylindrical surface 200 of bearing race 26. Thus, when motor 92 is actuated, sprocket 204 drives itself around chain 96 and causes the carriage to rotate on base 10 in either one direction or the other, depending on the direction of flow of pressure oil to motor 92.

Bearing 28, which is designed to rotatably support the carriage on base 10, is of economical construction, and nevertheless provides a high degree of accuracy for the rotary indexing movement of the carriage on the base. Referring particularly to FIG. 3, the lower and upper races 26 and 48, respectively, of bearing 28, have machined therein annular grooves 224. Wire rods 226 are secured around the inner and outer peripheries of these grooves, as illustrated. Bearing balls 228 are arranged in circumferentially spaced relation between the upper and lower races by a ball retainer 230. Since the entire weight of the carriage is supported on base 10 by means of balls 228, the bearing balls tend to Brinell extremely accurate race surfaces in the wire rod 226. The bearing assembly is protected from dust, dirt, and the like by means of a flexible shield 232 secured around the outer periphery of upper race 48 and overlapping the gap between the two races.

ELEVATOR MECHANISM

Figure 4:
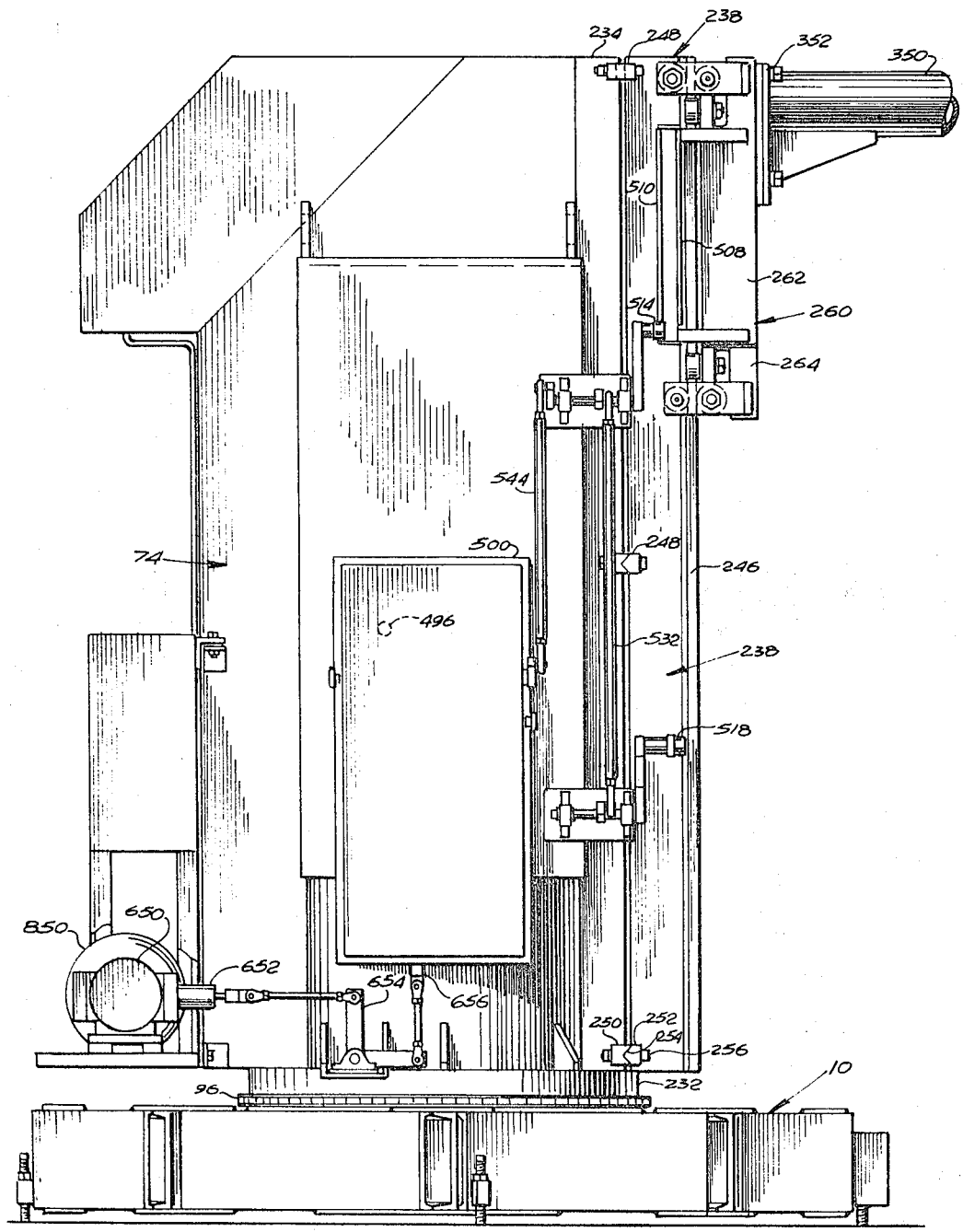
FIG. 4 is a side elevational view of one side of the machine.
Figure 12:
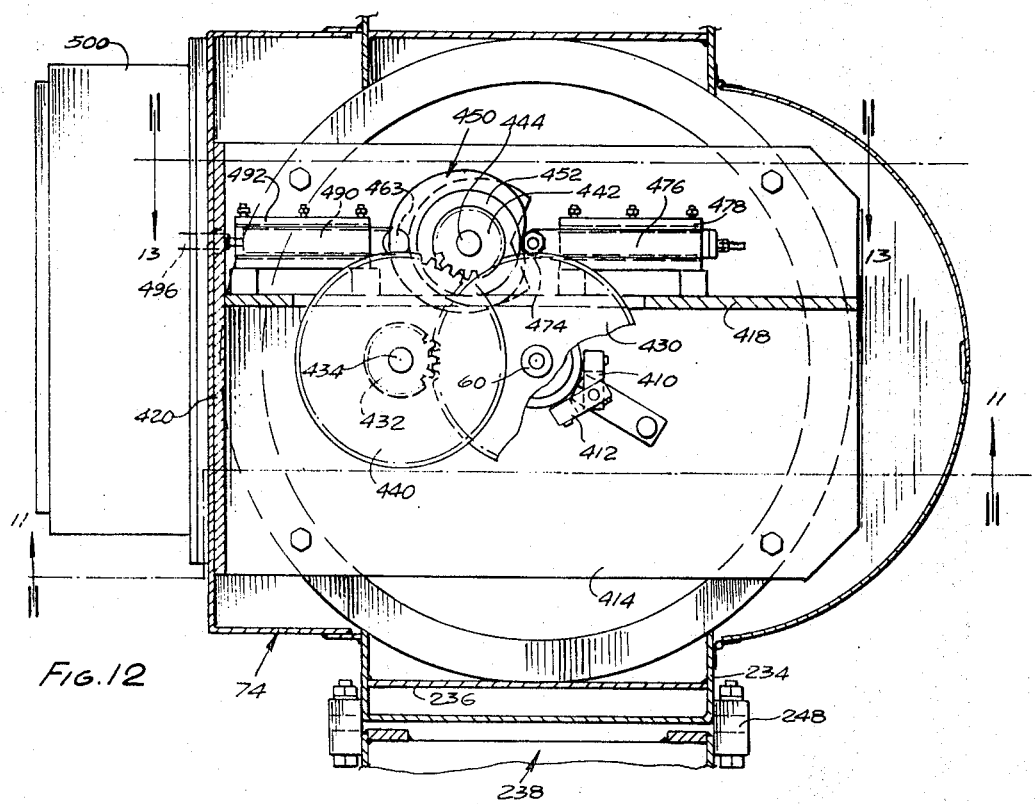
FIG. 12 is a sectional view taken along the line 12—12 in FIG. 11.

At one side of the structural shell structure 74, there is welded thereto and forms part thereof a vertically extending C-shaped elevator support 234 (FIGS. 4 and 12). Support 234 is reinforced by an internal vertically extending plate 236. The elevator column assembly, generally designated 238 and illustrated in FIG. 10, comprises a second C-shaped structural member 240, having a pair of vertically extending reinforcing bars 242 welded along the free inner edges of the C-shaped section. In addition there is welded to the outer face of the C-shaped section additional reinforcing bars 244. The cold rolled steel ways 246 on which the elevator housing 260 is guided for vertical movement extend vertically along and are welded to the vertically extending bars 244.

The elevator column assembly 238 is prefabricated and temporarily clamped by any suitable means onto the C-shaped section 234 of the structural shell 74. After the column assembly 238 is properly located on a machine, a plurality of six mounting lugs 248 are welded so as to interconnect the two C-shaped sections 234 and 240. Mounting lugs 248 are located two at the upper end of the elevator column, two at the lower end and two approximately midway between the upper and lower lugs. As is shown in FIG. 4, these mounting lugs comprise two blocks 250 and 252 which have V-shaped interengaging faces 254 and are clamped together by bolts 256. The two center lugs 248 have their V-shaped faces 254 extending horizontally, while the pairs of upper lugs and lower lugs are secured to the respective members 234 and 240 with the V-shaped faces 254 on one of each pair extending vertically and extending horizontally on the other. Thus, as illustrated in FIG. 4, for example, with the upper set of lugs 248 the one illustrated has its V-shaped faces 254 extending vertically, and the one not illustrated would have its V-shaped faces extending horizontally. Likewise, with the set of lugs at the bottom, the V-shaped faces of the lug illustrated extend horizontally, while the V-shaped faces of the lug not illustrated at the bottom would have its V-shaped faces extending vertically. With this arrangement it will be appreciated that the lugs 248, being welded to the members 234, 240 after the elevator column assembly 238 is properly located on shell 74, enable the elevator assembly to be removed from the machine and replaced thereon in its predetermined, accurately aligned position.

Figure 10:
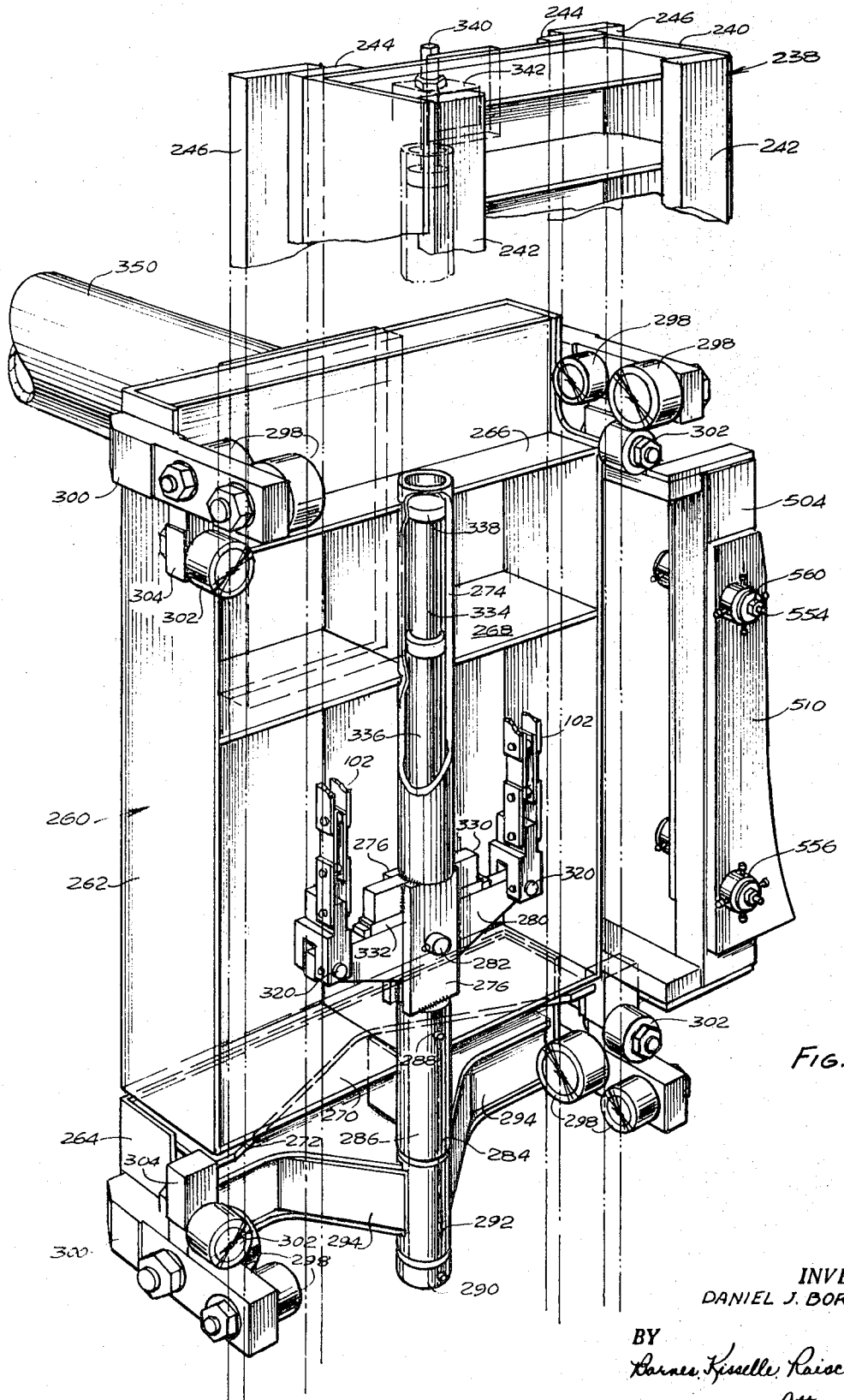
FIG. 10 is a fragmentary perspective view of the elevator as seen from the inside thereof.

Referring now to FIGS. 8, 9 and 10, the elevator housing 260 comprises an upper section 262 and a lower section 264. The upper section 262 comprises a C-shaped member which is internally braced by means of horizontally extending plates 266, 268 and 270. The lower section 264 of the elevator housing likewise comprises a C-shaped section which is internally braced by means of a plate 272.

Within the upper section 262 of the elevator housing, there is arranged a vertically extending tube 274 which is secured in place as by welding to the reinforcing plates 266 and 268. A pair of spaced plates 276 are welded to the lower end of tube 274 and form a clevis for a whiffletree 280 pivotally supported therebetween as by pin 282. An extension tube 284 is welded to the lower ends of plates 276. Within the extension tube 284 there is secured by a pin 288 a vertical shaft 286. To the lower end of shaft 286 is secured a collar 290, and between the lower end of tube 284 and collar 290 there is journalled a short tubular member 292 to which the lower section 264 of the elevator 260 is rigidly secured as by angled braces 294. Thus, the lower section 264 of elevator housing 260 is permitted to swivel in a horizontal plane relative to the upper section 262.

The upper and lower sections of the elevator housing 260 are guided for vertical movement on the ways 246 by means of four sets of guide roller assemblies 296, which are located two at the upper end of the upper section 262 and two at the lower end of the lower section 264. Each guide roll assembly 296 includes a pair of rollers 298 which are fixedly journalled on a support bar 300 with their inner peripheral surfaces spaced apart a distance corresponding to the thickness of the ways 246. Each guide roll assembly 296 also includes a guide roller 302 arranged to engage the outer edges of ways 246. At one side of elevator housing 260 guide rollers 302 are journalled in fixed positions on support blocks 304. These are the rollers that are shown at the left in FIG. 10. On the opposite side of the elevator housing 260, that is, the side illustrated in FIG. 7, the edge guide rollers 302 are journalled on eccentric pins 306 rotatably supported in support blocks 308 (FIG. 9). An arm 310 on the end of each pin 306 is adapted to be engaged by an adjusting screw 312 for rotatably adjusting the pins 306 and thus shifting the edge guide rollers 302 inwardly or outwardly so as to eliminate any sidewise clearance between the elevator housing 260 and the ways 246 on the elevator column 238.

Referring now to FIGS. 2 and 10, the chains 102 which which support elevator 76 are connected to the opposite ends of whiffletree 280 as at 320. Each chain extends upwardly from the whiffletree 280 around an idler sprocket 322 journalled within the upper end of the elevator column 238. Chains 102 then extend around a drive sprocket 324 on the output shaft of gear reducer 100 and then extend downwardly through a vertical housing 326 on carriage 44 and support counterbalance weights 328 at their lower ends. The weights 328 are selected to generally counterbalance the weight of the vertically movable elevator 76 with its boom 78 loaded. With this arrangement, the power required of hydraulic motor 98, which drives gear reducer 100, is only slightly greater than that required to overcome the inertia of the loaded boom. At the whiffletree connection between chains 102 and elevator housing 260, it will be noted that slight variations in the length of the two chains is permissible without unbalancing the vertical pull on the elevator housing. As a safety measure, a steel limit block 330 is welded between plates 276 above whiffletree 280, and a rubber pad 332 is inserted between blocks 330 and the upper edge of whiffletree 280 to prevent a sudden dropping of the elevator housing in the event that one of the chains 102 should break.

Within tube 274, there is arranged a compressible bumper 334 supported on a fixed riser 336 within tube 274. Bumper 334 is in the form of a cylinder formed of a compressible material, such as rubber, and having a diameter less than the inner diameter of tube 274. On the upper end of bumper 334, there is supported a steel plug 338, which is adapted to be contacted by an adjustable stop screw 340 at the upper end of the elevator housing 238. Adjusting screw 340 is mounted for vertical adjustment on a lug 342. Bumper 274 cushions the vertical movement of elevator 76 when it reaches the positive stop at upper end of its stroke. The lower-most position of the elevator is determined by the interengagement of counterbalance 328 with an adjustable stop screw 342 on the mounting plate 344 for gear reducer 100 (FIG. 2).

BOOM AND CLAMP ASSEMBLY

Boom 78 comprises a cylindrical tube 350 having a plate 352 welded to its inner end. Plate 352 is in turn bolted to a pad 354 welded to the upper housing 262 of the elevator. A pair of lugs 356 on pad 354 engage the lower edge of plate 352 to take the shear off the screws 358 by means of which the boom is bolted to pad 354. The boom is reinforced by a gusset structure 360 at its inner end.

Referring now to FIG. 5, each of the two heads 80, 82 on boom 78 include a box section 362. The box section 362 of the inner head 80 has a V-shaped saddle 364 and a flat pad (not illustrated) projecting inwardly therefrom, and the box section of the outer head 82 has a single, centrally located V-shaped saddle 366 projecting outwardly therefrom. These saddles and pad are located so as to engage with the three hooks 368 of the work carrier 86. Carrier 86, as is illustrated in FIG. 1, comprises a generally T-shaped member having a central, transversely extending support bar 370 with a cross-bar 372 at its inner end. Two of the hooks 368 are secured to the carrier at the ends of the cross-bar 372, and the other hook 368 is secured to the carrier at the end of the transversely extending bar 370.

Each of the heads 80, 82 also has a clamp member 374 pivotally mounted thereon as by the pins 376. On the inner head 80 two such clamps are mounted on the pin 376 in vertical alignment with the saddle 364 and the pad which is not illustrated. Outer head 82 has pivotally mounted thereon a lever 378, one end of which is connected with clamp 374 on head 82 by a link 380. The other end of lever 378 is connected with a triangularly shaped lever 382 on the inner head 80 by means of a link 384. Lever 382 is connected by a link 386 with the clamp 374 on head 80. A link 388 interconnects lever 382 with a bell crank 390 pivotally supported on the elevator column assembly, as at 391. The other end of bell crank 390 has a cam follower 392 journalled thereon and engaged in the groove of the vertically extending cam track 90 mounted at one side of the elevator column assembly. Cam track 90 has two vertically extending and laterally offset portions 394 and 396 interconnected by a gradually curved portion 398. As the elevator 76 travels vertically, cam follower 392 follows the groove of cam track 90 and actuates the clamp mechanism 84 through bell crank 390 when it traverses the curved portion 398 of cam track 90.

Referring to the solid and broken line showings of the clamp mechanism 84 in FIG. 5, it will be observed that when elevator 76 is at the upper end of the elevator column, the clamps 374 are in clamping engagement with the hooks of the work carrier 86, and when the elevator descends to a position wherein the cam follower 392 travels downwardly past the curved portion 398 of the cam track 90 and into the straight laterally offset portion 396 of the cam track 90, bell crank 390 pivots in a counter-clockwise direction, as viewed in FIG. 5, causes the clamp 374 to pivot upwardly to a position releasing the hooks of the work carrier 86.

All of the links of the clamp mechanism 84 are adjustable in length so that a firm clamping action can be obtained at each of the pivoted clamp members. In this way the work supporting rack 88 can be supported by the boom in a very rigid position, and there will be no tendency for the work rack 88 to sway relative to the boom in response to acceleration or deceleration of the boom during its indexing motion and vertical motion. The curved portion 398 of cam track 90 is located vertically so that clamps 374 will be actuated to release hooks 368 of carrier 86 just before the carrier is deposited on the saddles 22, 24 of the tanks 20. Likewise, when the elevator is in its lowermost position and moves upwardly, the clamps 374 are adapted to swing downwardly and firmly clamp the carrier 86 on the boom just after the saddles 364, 366 on the boom heads 80, 82 engage the underside of the hooks 368 on the carrier 86.

COLLECTOR RING ASSEMBLY

Figure 11:
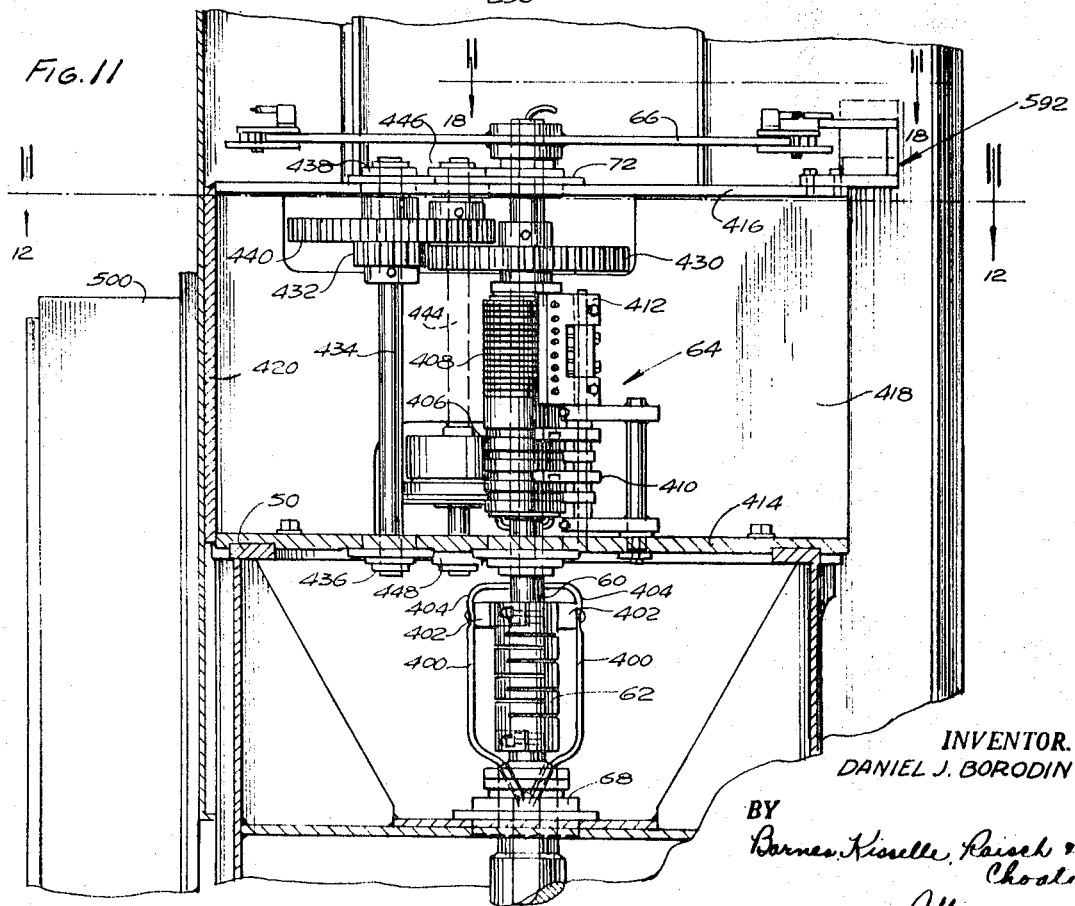
FIG. 11 is a fragmentary vertical sectional view of the machine showing the transducer and collector ring assemblies and taken along the line 11—11 in FIG. 12.

Referring to FIGS. 2 and 11, it will be observed that all the electrical controls, motors, etc., rotate with carriage 44 and the provision of collector ring assembly 64 is therefore necessary to connect these various electrically controlled or operated devices on the carriage with the source of electrical power. The power is conducted to the carriage by means of wire cables 400, which extend into the machine through the horizontal pipe 42 and then upwardly through the vertical pipe 36 and through the bearings 68 below the flexible coupling 62. The individual wires in cable 400 are connected to terminal strips 402 mounted at the upper end of flexible coupling 62. The individual wires of textension cables 404 are connected to the terminals strips 402 and then extend upwardly through the hollow pipe extension 60 to two sets of collector rings. The lower set of collector rings, designated 406, are mounted on pipe extension 60 and supply the three-phase power to the carriage hydraulic power pack. The upper set of collector rings 408 are also mounted on the stationary shaft extension 60 and supply current for the solenoids and other signal devices on the carriage. Collector bars 410 make contact with the lower set of collector rings 406 and the terminals of an upper bar assembly 412 make contact with the upper set of collector rings 408. These two collector bar assemblies are mounted on a base plate 414, which supports the bearing 68 above the flexible coupling 62. The upper bearing 72 is mounted on a support plate 416, which is in turn mounted on the base plate 414 by means of an upright wall 418 and an end wall 420.

CARRIAGE DECELERATION CONTROL

Referring now to FIGS. 11 through 17, the means employed for decelerating the indexing motion of the carriage is there illustrated. This control mechanism includes a stationary gear 430 keyed to the extension shaft 60 just above the collector ring assembly 64. Gear 430 meshes with a smaller gear 432 keyed to a vertical shaft 434. Shaft 434 is supported at its lower end by a bearing 436 in base plate 414 and at its upper end by a bearing 438 on support plate 416. A second gear 440 keyed to shaft 434 meshes with an output gear 442 (FIG. 12) which is keyed to a shaft 444. Shaft 444 has its upper and lower ends journalled on plates 416 and 414 by bearings 446 and 448, respectively. Shaft 444 is coupled with a decelerating cam assembly 450 by means of a magnetic clutch 452. Cam assembly 450 comprises an upper cam 454 having a centering recess 456 and two lower cams 458 and 460 which are symmetrically shaped and arranged in opposite relation to one another. The two lower cams 458 and 460 are stacked one upon the other, and the peripheral surfaces thereof which merge at the area designated 462 in FIG. 17 are engaged by a cam follower 463 which vertically overlaps both cams. Each cam 458, 460 is fashioned with a radially extending lug 464 having an enlarged opening 466 therein through which a stud 468 projects. Studs 468 are welded to the bottom face of the upper cam 454 and having a diameter much smaller than the openings 466 in lugs 464 on cams 458, 460. Adjusting screws 470 are mounted in lugs 464 and are adapted to engage the studs 468 for shifting each cam 458, 460 relative to cam 454. Clamping nuts 472 are provided for securely locking cams 458, 460 in their adjusted positions.

Cams 458, 460 and 454 are thus locked together as a unit. Normally this cam assembly is held in the position shown in FIGS. 16 and 17 by reason of the interengagement of a cam follower 474 with the centering recess 456 of cam 454. Follower 474 is journalled on a slide 476 (FIG. 16) which is mounted for reciprocation in a hollow guide block 478. Guide block 478 is mounted on vertical wall 418. The end of slide 476 opposite cam follower 474 has a depending arm 480 on which a shaft 482 is adjustably mounted. Shaft 482 projects into the hollow guide block 478, and has a disc 484 fixed to its inner end. A compression spring 486 is arranged between disc 484 and the opposite end of the spring chamber in block 478 so as to urge cam follower 474 radially into engagement with cam 454 of the cam assembly 450. However, when clutch 452 is engaged, the cam assembly 450 turns as a unit with shaft 444, and cam follower 463 is caused to follow the peripheral surface of cam 458 or 460, depending upon the direction of rotation of shaft 444.

Cam follower 463 is mounted on a slide 490 which is guided for reciprocating movement in a guide block 492 by linear ball bearings 491. Bearings 491 are preloaded by screws 493. The end of slide 490 opposite cam follower 463 is adapted to abut against a pin 494 extending through the end wall 420 from within a housing 500 in which the analog velocity controls are enclosed. Pin 494 is arranged within a sleeve 496 that projects through an opening 502 in the end wall 420.

ELEVATOR VELOCITY CONTROLS

Referring now to FIG. 7, the elevator housing 260 has a tubular member 504 mounted thereon by means of brackets 506. Tube 504 supports a pair of cams in the form of plates 508 and 510. Plate 510 has a cam edge 512 thereon, engaged by a cam follower 514, for controlling the acceleration and deceleration of the elevator adjacent the upper end of its stroke. Plate 508 likewise has a cam edge 516 thereon which is adapted to be engaged by a cam follower 518 when the elevator descends to control the acceleration and deceleration of the elevator adjacent the lower end of its stroke. Cam follower 514 is mounted on an arm 520 that is keyed to a shaft 522. Shaft 522 is journalled in a pair of pillow blocks 524 that are secured to a plate 526 mounted on the structural shell 74 of the machine. Two additional crank arms 528 and 530 are also keyed to shaft 522 to rotate therewith. The free end of arm 528 is connected by an adjustable link 532 with a crank arm 534 ot a shaft 536.

Shaft 536 is journalled in a pair of pillow blocks 538 secured to a mounting plate 540 on shell 74. Cam follower 518 is journalled on an arm 542, which is also keyed to shaft 536. Thus the actuation of either cam follower 514 or cam follower 518 will result in rotation of shaft 522. Rotation of shaft 522 will, in turn, through the adjustbale link 544 and the crank arm 546, produce a proportional rotation of a shaft 548 to which the crank arm 546 is keyed. Shaft 548 extends into housing 500 through the side wall thereof and is journalled in a bushing 550, as indicated in FIG. 22.

As will be apparent from FIG. 7, when the elevator approaches the upper end of its stroke, cam follower 514 will engage the low side of the cam edge 512, and will progressively rotate crank arm 546 in a counter-clockwise direction as the cam follower 514 rolls along the inclined edge of the cam. When the elevator is in the elevated position and starts its downward stroke, cam follower 514 is located with respect to cam plate 510 in the position illustrated in FIG. 7 and progressively rolls down the incline of cam edge 512 to rotate crank arm 546 in a clockwise direction.

As the elevator approaches the lower end of its stroke, the lower cam follower 518 engages the low side of the cam edge 516 of cam plate 508 and begins to rotate crank arm 546 in a counterclockwise direction. It will be noted that at the high side of cam edge 516, there is provided a notch 552, the purpose of which will be described hereinafter in connection with a detailed description of the velocity control of the elevator. When the elevator reaches the lower end of its stroke, cam plate 508 will be located in the broken line position illustrated in FIG. 7. As the elevator ascends, cam follower 518 will roll along the cam edge 516 to the low side of cam 516 to rotate crank arm 546 clockwise.

Cam plates 508 and 510 are mounted on tubular support 504 for vertical and horizontal adjustment relative to the two cam followers 514 and 518. This adjustment is accomplished by providing four studs 554 on the tubular support 504, two projecting from each side thereof, which extend through the enlarged openings of bushings 556 on the two cam plates 508 and 510. Four perpendicularly related adjusting screws 558 are threaded into each bushing 556 so that by adjusting these screws, each cam plate can be adjusted both vertically and horizontally with respect to its associated cam follower 514 or 518. After the cam plates 508 and 510 are properly adjusted, they are clamped in fixed position to tube 504 by means of nuts 560 threaded on the ends of studs 554 and engaging the outer ends of bushings 556.

TRANSDUCER MECHANISM

Referring now to FIGS. 11 and 18 to 21, the transducer disc 66 is keyed to the upper end of stationary shaft extension 60. Around its outer periphery, disc 66 is provided with V-shaped grooves 580 in the top and bottom faces thereof. A plurality of flags 582 are mounted around the periphery of disc 66 by means of grooves 580. Flags 582 are arranged in pairs, one above the other, and are mounted on disc 66 by means of bearing balls 584 located in sockets 586 on the juxtaposed faces of flags 582. The flags are clamped in position by means of a screw 588 acting in conjunction with a spacer 590. The number of pairs of flags 582 around transducer disc 66 corresponds to the number of stations around the machine, one pair of flags for each station. The manner in which the upper and lower flags 582 are clamped on transducer disc 66 enables each pair of flags to be shifted circumferentially as a unit around the transducer disc by simply loosening screw 588, shifting the two flags circumferentially the desired extent and then tightening screw 588.

The transducer readout assembly, generally designated 592, comprises a base plate 594 fixedly mounted on the top support plate 416, as shown in FIG. 11. Thus the transducer readout assembly rotates with the carriage around transducer disc 66. The transducer readout assembly generally comprises two microswitch assemblies designated 600 and 602. Switch assembly 600 controls the actuation of magnetic clutch 452 on the decelerating control for the carriage indexing motion, and switch assembly 602 is utilized for transmitting a signal to the logic controlling the machine motion to indicate that the boom has stopped at the center line of a station. Switch assembly 600 is controlled by the upper flag 582, and switch assembly 602 is controlled by the lower flag 582. Switch assembly 600 is mounted on the top face of a box-like support 604, while switch assembly 602 is mounted directly on the base plate 594. These two switch assemblies are substantially of identical construction. Each includes a microswitch 606, the arm 608 of which is adapted to be actuated by the enlarged head 610 of an adjusting screw 612. Each adjusting screw 612 is mounted at one end of a lever 614 journalled for pivotal movement in a horizontal plane by means of a stud 616. The opposite ends of the two levels 614 carry cam followers that are adapted to engage the peripheral cam edges of the upper and lower flags 582. Cam follower of switch assembly 600 that is adapted to engage the edge of the upper flag 582 is designated 618 and the cam follower of switch assembly 602 that is adapted to engage the edge of the lower flag 582 is designated 620. There is associated with each microswitch 606 an adjusting screw 622 which serves as a stop for the enlarged head of the adjusting screw 612 on the end of each lever 614. Screw 622 of each microswitch assembly is adjusted such that as soon as the head 610 of screw 612 moves out of contact with the adjacent end of adjusting screw 622, the microswitch 606 is tripped. The two levers 614 are biased by means of spring backed plungers 624 to positions such that the heads 610 of the screws 612 normally engage the ends of the adjusting screws 622.

The second adjustment in each microswitch assembly is provided by the screw 612. The adjustment of screw 612 determines at what point on flag 582 the cam follower associated therewith will engage the peripheral cam edge of the flag. In other words, adjusting screws 612 determine the points on flags 582 at which switches 606 will be tripped. As the head 610 of each screw 612 is advanced toward the lever 614, the cam follower associated therewith will engage the cam edge of its associated flag at an earlier point in the indexing movement of the carriage. As the head 610 of each screw 612 is shifted in a direction away from its lever 614, the cam follower associated therewith will engage the peripheral edge of its associated flag 582 at a later point in the indexing movement of the carriage.

It will be noted that the peripheral cam edge of each upper flag 582 comprises two symmetrically inclined edges 626, which are connected by an arcuate edge 628 concentric to the axis of rotation of the transducer disc. The cam edge of the lower flag 582 comprises two symmetrically disposed and similarly inclined edges 630 which intersect at a high point 632. While the two cam followers 618 and 620 are vertically aligned with one another, nevertheless the switch arrangement is such that the microswitch 606 of switch assembly 600 will be tripped when the cam follower 618 reaches a predetermined point on the inclined edge 626 of the upper flag 582 and microswitch 606 of switch assembly 602, on the other hand, is tripped at a later point in the travel of the carriage in relation to the microswitch of switch assembly 600. More specifically, switch 606 of switch assembly 602 is adjusted so that it trips when its cam follower 620 is closely adjacent the high point 632 of the lower flag 582.

The adjustability of the head 610 of screw 612 is very important. In the case of switch assembly 600, the importance of this adjustment lies in the fact that when the switch 606 trips, clutch 452 of the decelerating control is energized and at this instant the decelerating cam assembly 450 starts to rotate. As soon as this occurs, the carriage starts to decelerate and will continue to decelerate for a predetermined angular movement of cam assembly 450 which is determined by the rise in cam 458, 460, depending on the direction of rotation of the carriage. When the slide 490 has been shifted through a predetermined distance by reason of the rise in cam 458 or 460, the ouput of the pump which controls hydraulic motor 92 (FIG. 6) will be reduced to zero through analog controls within housing 500. Thus, the actuation of microswitch 606 of switch assembly 600 determines the point in the carriage travel at which it will start to decelerate, and since the carriage will move through a predetermined angle after deceleration has been initiated, it is important that the instant of commencement of deceleration be accurately controlled so that the carriage will ultimately stop at the same point in either direction of rotation. Thus, while the adjustment of screw 612 determines the instant at which deceleration of the carriage comes into play, nevertheless, the ultimate effect of this is to determine the point at which the carriage will actually stop.

Screw 612 is therefore adjusted so that the carriage will stop at the same point regardless of the direction in which it is traveling. Then, in order to assure that the point at which the carriage stops coincides with the center line of the desired station, the upper and lower flags 582 associated with that station are shifted as a unit circumferentially of the transducer disc so that the point of stopping of the carriage will correspond to the center line of the station.

As previously indicated, microswitch 606 of switch assembly 602 is provided for transmitting a signal to the logic when the carriage has arrived at the center line of a station to indicate the propriety of executing the next operation sequence, such as elevating. The adjustment of screw 612 in switch assembly 602 determines the range or band on lower flag 582 within which switch 606 will be tripped. If the tripping band or range of switch 606 of switch assembly 602 is too wide, then the boom could deposit the hooks of a carrier 86 outside the width of the V-shaped saddles 22, 24 on the tanks 20. If the tripping band of switch 606 is too narrow, it might be less than degree of positioning accuracy obtainable with the hydraulic controls in the machine. For example, if the maximum positioning accuracy obtainable with the hydraulic controls is ±1/32" and the tripping band were only 1/64", then the carriage could possibly stop at a desired station without transmitting an acceptable signal to the logic. Thus the tripping band of switch 606 of switch assembly 602 is adjusted by screw 612 to a width slightly greater than the maximum carriage positioning error in the machine but appreciably less than the minimum width required to deposit the hooks of a carrier 86 in the saddles 22, 24 on the tanks. The tripping band width is increased by shifting head 610 of screw 612 toward lever 614 and decreased by shifting head 610 away from head 610.

One important distinction between the two microswitch assemblies 600 and 602 resides in the fact that the bottom plate 634 on which switch assembly 602 is mounted is arranged to be shifted tangentially of the transducer disc 66. Plate 634, slidably mounted on a block 636, is provided with adjusting screws 638 at opposite ends. It will be realized that when the whole switch assembly 602 is shifted tangentially of the transducer disc, the range of angular movement through which the cam follower 620 is adapted to actuate, its microswitch 606 is likewise shifted tangentially of the transducer disc. This enables the band of signal transmissions to be shifted circumferentially to correspond with the center line position determined by the decelerating control 450.

The transducer mechanism also includes a third microswitch 640 mounted on each of the upper flags 582. On the top face of the box support 604 of the transducer readout assembly, there is mounted a cam 642 in the form of an elongated bar having symmetrically inclined cam edges 644 connected by an arcuate edge 646 concentric with the axis of rotation of the carriage. The purpose of the microswitches 640 is to identify to the logic controlling the machine the station at which the boom is located. The position and design of cam 642 is such that each microswitch 640 is tripped just prior to the instant that its associated decelerating flag 582 trips microswitch 606 of switch assembly 600.

It will be noted that if all the upper flags 582 and the lower flags 582 are identically shaped adjustment of the readout assembly 592 for one station will affect the flags at all the stations in the same manner.

ANALOG VELOCITY CONTROL

Before discussing in detail the analog velocity control, it should be mentioned that the motor-driven pump 650, which drives the carriage indexing motor 92 and the elevator motor 98, is preferably of the conventional reversible, wobble-plate type. The output of the pump is therefore zero when the wobble plate is perpendicular to its axis of rotation, and the pump is capable of being reversed by tilting the wobble plate from one side of its neutral axis to the other.

Referring now to FIGS. 1, 4 and 22, pump 650 is controlled by a servomechanism 652, which is in turn actuated by a linkage 654 connected to the output shaft 656 of the analog velocity control 658, which is enclosed in housing 500. The analog velocity control assembly 658 has as its purpose to control the output of pump 650 and thereby control the velocity of the carriage and the elevator at every point in their travel, depending upon the signals fed into the analog velocity control assembly. With respect to the velocity of the elevator, the signals are fed into the analog control by means of cam plates 508, 510, and the linkage which controls the rotation of shaft 548. With respect to the indexing motion of the carriage, the signal for deceleration is fed into the analog velocity control assembly by means of cams 458, 460 and slide 490 acting through the pin 494 and the sleeve 496 (FIG. 26). The acceleration signal for the indexing motion of the carriage is fed into the analog velocity control assembly by means of a linear cam 660 slidably mounted on a guide block 662, and reciprocated by the piston rod 664 of a hydraulic cylinder 666.

Referring now to FIGS. 22 and 26, sleeve 496, in which the pin 494 is retained, is slidably mounted in a support block 668 within housing 500. Block 668 forms part of a weldment which includes blocks 670, 672, 674 and 676. This weldment is attached to a mounting plate 678 within housing 500 by means of screws 680 within holes 682 in block 670 and hole 684 in block 676. Sleeve 496 receives a threaded adjusting screw 686 adapted to be locked in place by a jam nut 688 for adjusting the effective length of sleeve 596 relative to the end of slide 490. A groove lug 690 is fixed on sleeve 496. A guide block 692, journalled on a pin 694 of a disc 696, engages the groove 698 in lug 690. Disc 696 has a central stub shaft 700 journalled in a bushing 702 welded to block 668. The relative position of the pin 694 on disc 696 is indicated in FIG. 22. On the opposite side of disc 696 from guide block 692, and offset 90° therefrom, there is a second guide block 704 which engages within a rectangular slot 706 in a block 708. Block 708 is fixedly clamped to a hollow shaft 710. Shaft 710 is slidably guided for vertical reciprocation within bushings in blocks 670 and 676 and is prevented from rotating by reason of the guide shaft 711 extending through block 708 and secured to blocks 670 and 676.

With this arrangement, it will be apparent that when cam follower 463 (FIG. 16) rides up on the high side of cam plate 458 or 460, slide 490 is shifted to the right, as viewed in FIG. 16, and sleeve 496 is shifted to the left, as viewed in FIG. 26. This causes disc 696 to rotate clockwise, as viewed in FIG. 22 which in turn causes the hollow shaft 710 to be shifted downwardly by reason of the interengagement of guide block 704 in groove 706 of block 694. Within hollow shaft 710, there is arranged a compression spring 712. The upper end of spring 712 bears against a yoke 714, on which is journalled a cam follower 716 which engages the curved cam surface 718 of cam 660. The lower end of spring 712 bottoms on a lug (not illustrated) which is adjustable lengthwise of shaft 710 by means of a screw 720 threaded through a support bracket 722 mounted on back plate 678. Thus spring 712 normally biases hollow shaft 710 upwardly, which in turn biases disc 696 in a counterclockwise direction, as viewed in FIG. 22. Under the influence of spring 712, disc 696, acting through guide block 704 and guide block 694 urges rod 494 against the end of slide 490 and in turn the slide against cams 458, 460. Obviously spring 712 also urges cam follower 716 into engagement with the cam surface 718 of cam 660.

The input signal mechanism for the elevator velocity control is very similar to that described for the deceleration control of the indexing motion of the carriage. Shaft 548 is journalled in a block 724 which forms part of a weldment that includes blocks 726, 728 and 730. This weldment is fixedly mounted on the back plate 678. On the inner end of rod 548 there is keyed a disc 732 which carries a guide block 734 slidably engaged within a rectilinear slot 736 in a block 738. Block 738 is clamped to a hollow shaft 740 which is arranged for vertical sliding movement in blocks 726 and 730. A spring similar to spring 712 is enclosed within shaft 740 with its upper end abutting against the closed end of shaft 740 and its lower end abutting against the upper end of an adjusting screw 742 threaded through a bracket 744 on back plate 678. The spring within hollow shaft 740 normally biases the shaft upwardly, which in turn biases disc 732 in a counterclockwise direction, as viewed in FIG. 22. Disc 732, acting through shaft 548 and link 544, biases arm 530 (FIG. 7) upwardly into contact with a stop screw 746 adjustably mounted on a bracket 748 on the mounting plate 526 for the elevator velocity control linkage.

With this arrangement, it will be observed that when cam follower 514 or cam follower 518 rides up the inclined cam surface of its respective cam plate 508 or 510, shaft 548 and disc 732 are rotated in a clockwise direction, as viewed in FIG. 22, to shift shaft 740 downwardly against the bias of the spring enclosed within this shaft.

The analog velocity control assembly includes a factoring mechanism generally designated 750 (FIG. 23). The purpose of this mechanism is to amplify as desired the travel of the output shaft 656 in relation to the shafts 710 and 740. This factoring mechanism includes a plate 752 on which two blocks 754 are slidably guided by means of guideways 756. Plate 752 is fixedly mounted on a block 757 which is in turn fixed on back plate 678. On each slide block 754 there is pivotally supported as by a pin 758 a slotted slide channel 760. Each slide block 754 is adapted to be adjusted lengthwise of the guideway 756 by an adjusting screw 762. The extent to which each guide block 754 can be shifted in one direction is controlled by an adjustable stop screw 764.

A block 766 on hollow shaft 710, which is connected to move with block 708 by means of an adjusting screw 768, has a guide block 770 thereon which engages within the groove of the upper slide channel 760. A similar block 780 connected with block 738 by means of an adjusting screw 782 has a guide block 784 thereon which engages within the groove of the lower slide channel 760. Block 757 on which the factoring mechanism 750 is mounted has bushings therein through which two shafts 786 and 788 are slidably guided. A block 790 is clamped to shaft 788 and slidably receives shaft 786. Likewise a block 792 is clamped to shaft 786 and slidably receives shaft 788. Each of the latter two shafts have guide blocks 794 and 796, respectively, mounted thereon, guide block 794 engaging within the groove of upper slide channel 760 and the guide block 796 engaging within the groove of the lower slide channel 760.

With the above arrangement, it will be noted that by adjusting the screw 762 for the upper slide channel 760, the relative lengths of the lever arms between guide blocks 770 and 794 in relation to the pivot pin 758 can be varried, and likewise by adjusting screw 762 for the lower slide channel 760, the relative lengths of the lever arms between guide blocks 796 and 784 in relation to the pivot pin 758 can be varied. Screws 762 are provided with knobs 798 located exteriorly of housing 500.

It is important that at the null point of pump 650 the slide channels 760 are perpendicular to shafts 786 and 788 so that while adjustment of screws 762 will affect the velocities of the elevator and carriage, it will not move either of these two shafts at null point and thus will not at that time shift the ouput shaft 656. Screws 768 and 782 enable adjustment of blocks 766 and 780 to assure that at the null point of the pump slide channels 760 are perpendicular to shafts 786 and 788.

The analog velocity control mechanism 658 also includes a mode selector mechanism which permits the use of a single pump 650 for driving both the carriage and the elevator at the desired controlled velocity. This mode selector mechanism has as its function to selectively connect shaft 786 or 788 with the output shaft 656. This mode selector mechanism includes an output block 800 clamped to the output shaft 656. Two hydraulic cylinders 802 and 804 are mounted on output block 800. Each cylinder has a piston rod associated therewith and projecting out both ends of the cylinder. The piston rod of cylinder 802 is designated 806, and the piston rod for cylinder 804 is designated 808. These two cylinders are interconnected such that their piston rods move in unison but in opposite directions. To the lower end of piston rod 806, there is connected a limit sleeve 810 having a laterally projecting arm 812 at its lower end, the upper surface of which is accurately milled. The upper end of piston rod 806 is connected with second limit sleeve 814 having an arm 816 at the upper end thereof, the lower face of which is accurately milled. As illustrated, these limit sleeves 812 and 814 have a one-way connection with piston rod 806 such that when rod 806 shifts downwardly, limit sleeve 814 is pulled downwardly, and when the piston rod moves upwardly, limit sleeve 810 is pulled upwardly. Adjustable stop screws 818 are provided on each sleeve for accurately adjusting the milled faces of the arms 812 and 816 relative to limit block 800.

Shaft 788 has an arm 820 fixed to the lower end thereof, the upper face of which is accurately milled, and likewise shaft 786 has a laterally extending arm 822 adjacent the lower end thereof, the bottom face of which is accurately milled. Arm 822 has a hollow shaft 824 welded thereto. The arrangement internally of shaft 824 is shown in FIG. 25, and includes a vertically shiftable plunger 826 which is biased upwardly by means of a spring 828 which is retained by means of a threaded bushing 830, through which the head 832 of plunger 826 projects. The lower end of shaft 788 has a similar plunger 834 arranged within the lower end thereof and projecting downwardly through the arm 820, as illustrated in FIG. 22. The opposite ends of piston rod 808 are provided with bumper blocks 836 adapted to engage with the ends of plungers 826 and 834.

The mode selector arrangement is operative to connect the output shaft 656 with either the velocity control shaft 788 of the carriage or the velocity control shaft 786 of the elevator. For example, assuming that at a particular point in the machine cycle the next operation to be performed by the machine is an elevating motion, cylinders 802 and 804 will be actuated such that piston rod 806 will be shifted upwardly and piston rod 808 will be shifted downwardly. Thus, arm 822 of shaft 786 will be urged downwardly, and arm 812 on limit sleeve 810 will be urged upwardly so that the milled faces of these two arms will be brought into clamping engagement and thereafter any vertical movement of arm 786 will be transmitted to the output shaft 656. In the same manner if the next operation of the machine is an indexing one rather than an elevating one, cylinders 802 and 804 will be operated by the logic of the machine to shift piston rod 806 downwardly and piston rod 808 upwardly. In this manner, the milled faces of arms 816 and 820 will be brought into clamping engagement and the output shaft 656 is thus effectively interlocked with the velocity control shaft 788 of the carriage.

Springs 828 are so selected that the tension of these springs is less than force exerted by cylinder 802. Springs 828 thus prevent cylinder 804 from exerting a greater force on arms 812 and 816 than cylinder 804 and thus assures that one of the stop screws 818 will always be in engagement with limit block 800 during operation of the carriage or elevator.

Referring to FIG. 24, it will be noted that the output shaft 656 is hollow, and the lower end thereof is connected to the linkage 654 of the servomechanism by means of a rod 840 which projects upwardly into shaft 656. A compression spring 842 within shaft 656 has its lower end bottoming on a vertically adjustable plug 844 and its upper end abutting a collar 846 fixed against a shoulder 847 within shaft 656. The upper end of rod 840 is threaded to receive a nut 848 for enabling adjustment of the tension in spring 842.

Spring 842 in the output shaft 656, as well as springs 712 in the two hollow shafts 710 and 740 serve a very desirable purpose. It will be noted, for example, that the input connections to the analog control from both the velocity controls of the carriage as well as the elevator, represent rather solid linkages extending directly to hollow shafts 710 and 740. Thus it can be visualized that rather high forces are transmitted to these two hollow shafts. The servomechanism 652 for the pump 650, on the other hand, is a rather delicate mechanism and cannot instantaneously respond to great variations in the amplitude of the signal transmitted to it. For example, the servomechanism is not capable of instantaneously reducing the output of the pump from maximum to zero as it might be called upon to do in the case of an emergency stop. Thus, spring 842 is incorporated in the mechanism to accommodate this condition. If there is a tendency to transmit a signal to the servomechanism at a rate faster than the wobble plate in the pump 650 is able to change its position, spring 642 will come into play and more or less store the signal until time as the wobble plate of the pump is able to accommodate the change in signal transmitted to it by the servomechanism.

HYDRAULIC MECHANISM

Figure 27:
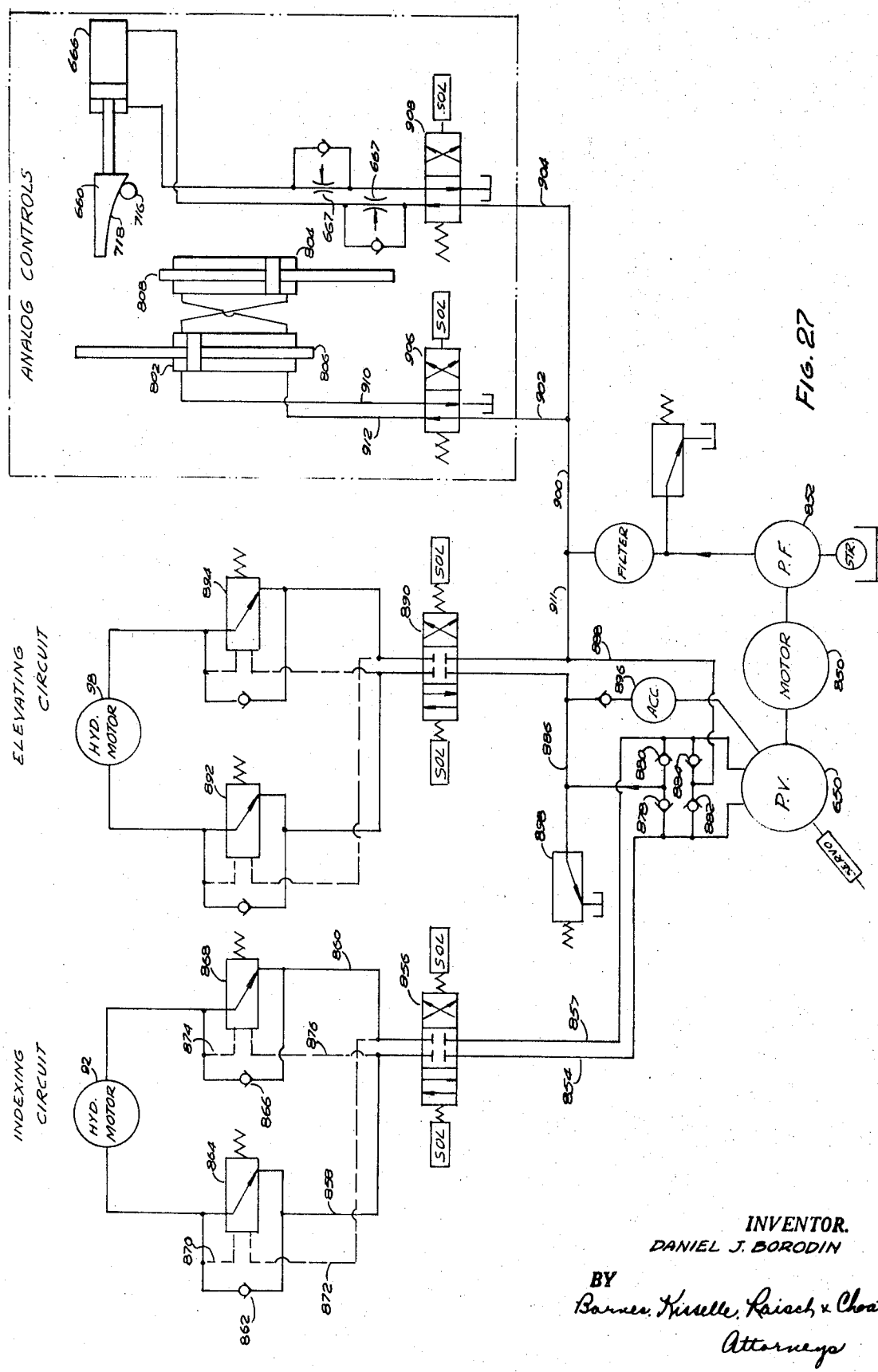
FIG. 27 is a diagrammatic view of the hydraulic circuit for the machine.

The hydraulic system for the machine is shown diagrammatically in FIG. 27. The high pressure pump 650 is driven by a motor 850 which also drives a supercharging pump 852. The two ports of pump 650 are connected by conduits 854 and 857 with the closed center of a four-way, three-position solenoid valve 856. The opposite side of valve 856 has two conduits connected thereto and designated 858 and 860. These two conduits extend to the ports of the hydraulic motor 92 which drives the carriage 44. Within line 858 there is arranged a check valve 862 and a counterbalancing valve 864. Within conduit 860 there is arranged a check valve 866 and a counterbalancing valve 868. Valve 864 is operated by a pilot line 870 connected with conduit 858 between check valve 862 and hydraulic motor 92, and a second pilot line 872 connected to conduit 860 between solenoid valve 856 and check valve 866. Likewise, counterbalancing valve 868 is operated by a pilot line 874 connected into conduit 860 between check valve 866 and motor 92, and a second pilot line 876 connected with conduit 858 between solenoid valve 856 and check valve 862.

Normally, during indexing motions pump 650 discharges through the port leading to conduit 654. The initiation of indexing motion and the selection of direction in which the carriage is to be indexed are accomplished by shifting valve 856 to the right or to the left of center position, the decision originating with the logic of the machine.

Solenoid valve 856 is operated by the logic of the machine, and when de-energized it locks the carriage in fixed position. The counterbalancing valves 864 and 868 are provided for preventing the carriage from overrunning the hydraulic motor 92.

In addition to pump 650, the two conduits 854 and 857 are interconnected by a series of four check valves 878, 880, 882 and 884. The line between check valves 878 and 880 is connected to the hydraulic motor 98 which operates the carriage by a conduit 886. The line between check valves 882 and 884 is connected by a conduit 888 with the other side of hydraulic motor 98. Conduits 886 and 888 are controlled by a four-way, three-position solenoid valve 890. The operation of valve 890 is controlled by the logic of the machine and determines whether the elevator travels upwardly or downwardly. In the case of the elevator mechanism, conduit 886, regardless of the position of valve 890, is the pressure line and conduit 888 is the return line to the pump. In other respects, the hydraulic circuit for motor 98 is similar to that described for motor 92 and includes counterbalancing valves 892 and 894 which are counected and pilot operated in substantially the same manner as the counterbalancing valves 864 and 868 in the hydraulic circuit for motor 92.

As is customary, an accumulator 896 is connected with pump 650 in the conventional manner to provide high pressure for servo assist at all positions of the wobble plate of the pump. Likewise a relief valve 898 is provided for limiting the maximum pressure in the system.

The low-pressure side of the system receives its pressure from the supercharging pump 852 through a conduit 900. Conduit 900 is connected with two branch lines 902 and 904 which extend to two four-way, two-position solenoid valves 906 and 908, respectively. Valve 906 controls the direction of flow to the mode selector cylinders 802 and 804. When the logic energizes valve 906 to interlock carriage velocity control shaft 788 with the output shaft 656, conduit 910 becomes the pressure line and conduit 912 becomes the return line. When the logic de-energizes valve 906 to interlock the elevator velocity control shaft 785 with the output shaft 656, conduit 912 becomes the pressure line and conduit 910 becomes the return line.

Valve 908 controls the operation of the accelerator cam actuating cylinder 666. When the logic de-energizes valve 908, cam 660 is shifted to the left and re-cocks the acceleration control to ready position as shown in FIG. 22. On the other hand, when the logic energizes valve 908, cylinder 666 shifts cam 660 to the right, initiating smoothly controlled deceleration.

The low-pressure system of the hydraulic circuit, which is controlled by supercharging pump 852, is connected with pump 650 by a conduit 911. This assures an ample supply of fluid to the inlet port of pump 650 at all times. Thus it eliminates any tendency for cavitation of pump 650.

OPERATION

In describing the operation of the various components of the machine, let us assume that the carriage has indexed to a position wherein the boom is located at Station 3 in the lowered position, and that the logic of the machine is programmed to produce the motion pattern illustrated in FIG. 30. Before actual initiation of the indexing motion of the carriage from Station 3 to Station 1, solenoid valve 890 is de-energized by the logic to lock the elevator in the lowered position. Momentarily thereafter, the logic of the machine energizes solenoid valve 906 so as to shift piston rod 806 downwardly and piston rod 808 upwardly. This effectively interlocks the output shaft 656 with the carriage velocity control shaft 788. At this time the wobble plate of the pump 650 is at the null point and its output is zero. After the shifting of piston rods 806 and 808 is completed, the logic energizes the appropriate solenoid of valve 856 and solenoid valve 908. Energizing of solenoid valve 856 starts the carriage in motion in the proper direction determined by the logic. Energizing of solenoid valve 908 produces a controlled retraction of cam 660. Thus hollow shaft 710 under the influence of spring 712 starts moving upwardly at a rate determined by the slope on the cam 660. This causes block 766 to rise and block 790 on the factoring mechanism to move downwardly. Since, as previously indicated, at this time shaft 788 is interlocked with the output shaft 656, the output shaft starts moving downwardly, and through the linkage 654 actuates the servomechanism 652 to increase the output of pump 650 from zero and thus accelerate the indexing motion in accordance with the curve of the cam edge 718 on cam 660, until it attains its maximum velocity at the flattened end of the cam.

Referring now to FIGS. 18 through 21, when the readout assembly 592 approaches the set of flags 582 aligned with Station 1 microswitch 640 for Station 1 is tripped by the cam bar 642 and signals the logic that the carriage is approaching a station at which it will stop. At a predetermined point in advance of Station 1, the cam follower 618 of the microswitch assembly 600 will engage the upper flag 582 of Station 1 and trip the microswitch 606 of microswitch assembly 600. This will energize magnetic clutch 452 and will cause the decelerating cam assembly 450 to start rotating in a clockwise direction on the carriage. As soon as this occurs, slide 490 will start to shift axially and produce a corresponding axial movement of sleeve 496 in a direction to the left, as viewed in FIG. 26. This movement of sleeve 496 will cause disc 696 to rotate clockwise, as viewed in FIG. 22, and shift block 708 and hollow shaft 710 downwardly. Block 766 is thus caused to move downwardly, and block 790 upwardly. Since shaft 788 is still interlocked with output shaft 656, the latter will be shifted vertically upwardly and acting through the linkage 654 will actuate the servomechanism 652 and begin to tilt the wobble plate in pump 650 back toward its neutral position at a rate controlled by the design of cam 458. When cam follower 463 reaches the position indicated by broken lines in 463a in FIG. 17 on cam 458, servomechanism 652 will have reduced the output of pump 650 to zero and the carriage will have been decelerated to a smooth stop. At the same time cam follower 620 is actuated by the lower flag 582 of Station 1 to trip microswitch 606 of switch assembly 602 to transmit to the logic of the machine a signal indicating that the carriage has stopped in a proper position for picking up a rack at Station 1. The logic of the machine then de-energizes solenoid valve 856 of the indexing circuit to lock the carriage in the indexed position at Station 1, and energizes solenoid valve 890 of the elevating circuit such that the hydraulic motor 98 will start raising the elevator. At the same time, the logic of the machine will de-energize the solenoid valve 906 of the mode selector to interlock shafts 786 and 656. Also solenoid valve 908 is de-energized to shift cam 660 back to the position shown in FIG. 22.

Referring to FIG. 7, when the elevator is in the lowered position, cam follower 518 is seated within the notch 552 of the cam plate 508. It should be pointed out at this time that with the elevator in either its lowermost position or its uppermost position, the position of the input shaft 548 is such that a residual signal transmitted to the analog control and the servomechanism 652 maintains the wobble plate of pump 650 at a position just short of its null point. This is necessary so that when valve 890 of the elevator circuit is energized, pump 650 will have at least a slight output to initiate elevator movement. Now, as soon as the elevator begins to rise, there is a slight acceleration, then a slight deceleration at the point designated 552a in FIG. 7, and then a short travel at generally constant velocity as indicated at the portion 552b on cam plate 508. The portion 552b corresponds to the interengagement of saddles 364 and 366 on the boom with the hooks of the carrier 86. As soon as the carrier 86 with its rack is lifted off of the saddles 22, 24 of the tanks, the cam follower 518 engages the smoothly curved portion 552c of cam plate 508 and the elevator accelerates in an upward direction.

Referring to FIGS. 7 and 22, it will be noted that as cam follower 518 travels along the portion 552c of cam plate 508, the input shaft 548 of the analog control rotates counterclockwise as viewed in FIG. 22, and causes disc 732 to likewise rotate in a counter-clockwise direction. Thus block 738 is shifted vertically upwardly and causes hollow shaft 740 to lift block 780. Block 792 is thus shifted downwardly, and since shaft 786 is interlocked with the output shaft 656, the output shaft 656 is shifted downwardly and through the linkage 654 actuates the servo 652 to increase the output of pump 650 and thereby increase the upward velocity of the elevator. When cam follower 518 rides off the lower end of cam plate 508, the elevator has attained its maximum velocity as determined by the setting of screw 746 that is engaged by the arm 530 to which the adjustable link 544 is connected.

It should be pointed out that as the cam follower 518 is traversing the portion 552 of cam plate 508, cam follower 392 at the end of the clamp linkage on the boom is traversing the curved portion 398 of the cam track 90 to swing the two clamps 374 downwardly and thereby rigidly clamp carrier 86 on the two heads of the boom.

As the elevator approaches its uppermost position, cam follower 514 rides into engagement with the cam edge 512 of cam plate 510. Thus, as the elevator continues to travel upwardly, arm 520 is progressively rotated in a counter-clockwise direction, as viewed in FIG. 7, which, acting through the linkage to the analog control, causes the input shaft 548 to rotate in a clockwise direction, as viewed in FIG. 22. Disc 732 thus rotates clockwise to shift block 738 downwardly and hollow shaft 740 thus causes block 780 to shift downwardly a corresponding distance. In turn, the factoring mechanism causes block 792 to shift upwardly and since shaft 786 is interlocked with output shaft 656, output shaft 656 shifts vertically upwardly and causes the servomechanism 652 to gradually reduce the output of pump 650. However, as pointed out previously, when the bumper 334 (FIG. 10) engages the positive stop screw 340 at the upper end of the elevator column to arrest vertical movement of the elevator, the input shaft 548 still applies a residual signal to the analog control. When the elevator reaches its uppermost position, the logic of the machine de-energizes the solenoid valve 890 in the elevator circuit and energizes the solenoid valve 856 of the indexing circuit, so that the hydraulic motor 92 will be conditioned to rotate the carriage in the direction from Station 1 to Station 2. At the same time, the solenoid valve 906 of the mode selector is energized to interlock shaft 788 with the output shaft 656 and the solenoid valve 908 is energized so that the accelerating cam 660 will be shifted in a direction to the right, as viewed in FIG. 22. Thus the indexing motion clockwise starts and its acceleration is controlled by the shape of cam 660. As the boom on the carriage approaches Station 2, microswitch 606 of switch assembly 600 is tripped to energize magnetic clutch 450 and thus produce controlled deceleration of the carriage and final stopping of the carriage at a position wherein the boom is aligned with the center line of Station 2. The elevator controls then function in a manner opposite to that previously described for the elevating motion—to lower the boom and deposit the rack it picked up from the tank at Station 1 and deposit it at Station 2.

In connection with the indexing motion of the carriage, it will be observed that while the null point of the pump is designated by the positions 463a and 463b on cams 458 and 460, respectively, these cams continue to rise above these points. Thus, if the carriage should tend to overtravel, the servomechanism 652 will tilt the wobble plate in the pump beyond the null position and thus reversing the output of the pump and returning the carriage to the desired center line position relative to the station at which it is stopping. It should also be noted that when magnetic clutch 452 is de-energized, it returns to the centered position illustrated in FIGS. 16 and 17 under the influence of spring 712 in hollow shaft 710 to initiate the return movement, and the centering spring 486 within the guide block 478 to complete the return movement to the centered position wherein the cam follower 474 engages the depression 456 in the centering cam 454.

It should also be noted that springs 712 in hollow shafts 710 and 740 provide a further desirable function. In the case of overtravel of the carriage or reversal of the carriage or elevator motion, there is no reversal of forces in the linkage with a consequent backlash effect. Springs 712 always act in the same direction to urge cam followers 463, 716, 514 and 518 into engagement with their respective cams. Thus the vast majority of the operating clearances are close up in one direction and substantially all lost motion in the linkages is eliminated.

In the arrangement illustrated, the maximum velocity, acceleration and deceleration of the carriage and the elevator are independently controlled. With respect to the carriage, the maximum velocity is controlled by the flattened tail-end portion of cam 660, whereas, in the case of the elevator, its maximum velocity is controlled by the setting of screw 746. The acceleration of the carriage is determined by the shape of cam 660 and the setting of the flow control valves 667 in circuit with cylinder 666 and its deceleration is controlled by the shape of cams 458 and 460. The acceleration and deceleration of the elevator in its vertical travel is controlled by the shape of the cam plates 508 and 510.

The factoring mechanism 750 enables the velocity of either the elevator or the carriage to be multiplied by an infinitely variable factor throughout the ranges of movement. However, if it is desired to add or subtract a fixed increment of velocity to the carriage, this can be accomplished by adjusting rod 494 relative to sleeve 496 by means of the adjusting screw 686. Likewise, if it is desired to add or subtract an increment of velocity to the motion of the elevator, this can be accomplished by adjusting the length of link 544.

With respect to the transducer assembly, one of the unique features of this arrangement resides in the fact that all of the upper flags 582 and all of the lower flags 582 can be machined simultaneously so that they are identical within extremely close tolerances. In addition, each set of upper and lower flags are shiftable circumferentially of the transducer disc 66 as a unit. Thus, once the readout assembly 592 is properly adjusted for one station, it is adjusted properly for all stations, and the only further adjustment that might have to be made is the shifting of the flags 582 circumferentially. This not only simplifies the initial adjustment of the machine but also enables shifting of the center line of stations from time to time (to accommodate a different set of plating tanks, for example), by merely shifting the sets of flags 582 circumferentially of the transducer disc 66 to register with the readjusted center line of one or more stations.

It will be appreciated that although the invention has been described in connection with a dial machine, that is, a machine the carriage of which rotates about a central axis, nevertheless numerous features of the machine described are equally applicable to a work-handling machine that operates along a linear path rather than a circular path. The machine according to the present invention designed to operate in a circular path, does, however, possess several distinct advantages. For example, as illustrated in FIGS. 29 through 33, the boom can be programmed to travel in a desired path of movement without having to return to a starting point, as is the case of a machine which operates along a linear path of movement. Further, a machine of the type specifically disclosed eliminates the need for a track structure to support the carriage and thus constitutes a single, self-contained unit. In addition, it will be noted that the structural mass of the machine is located closely adjacent the center of the machine. This means that the work supported at the end of the boom is adapted to be moved with a maximum velocity, while the heavy mass of the machine is rotating at a much slower velocity. Thus, the power required to index the machine and the kinetic energy that has to be dissipated in order to stop the indexing motion is reduced to a minimum.

I claim:

1. In a work-handling mechanism of the type including a base, means forming a plurality of spaced-apart stations adjacent the base, a carriage mounted on the base for traversing said stations and a variable-speed motor unit for driving said carriage on the base, means for decelerating said motor unit when the carriage approaches a predetermined station comprising a rotatable cam on the carriage, a cam follower on the carriage engaging said cam, motor control means interconnecting said cam follower with said motor unit such that the speed of the motor unit varies in accordance with the displacement of said cam follower, means normally retaining said cam in a position wherein the carriage velocity is at a maximum value and means responsive to arrival of the carriage at a predetermined point in advance of said predetermined station for initiating rotation of said cam at a speed proportional to the speed of the carriage, said cam being shaped to decelerate the carriage when the cam is rotated and to reduce the velocity of the carriage to zero when the carriage advances from said predetermined point to a position in alignment with said predetermined station.

2. A work-handling mechanism as called for in claim 1, wherein said cam has a cam edge engaged by said cam follower, said cam edge being shaped to produce a reversal of said motor unit in the event the carriage tends to override said motor control means.

3. In combination, a base, means forming a plurality of stations spaced accurately apart along said base, a carriage mounted for movement on the base for traversing said stations, a hydraulic motor-pump unit for driving said carriage on said base, said motor-pump unit being of the variable-speed type, and means for decelerating said carriage to zero velocity when the carriage arrives at a position in alignment with a predetermined station comprising a mechanism adapted to control the speed and direction of the motor of said unit, a rotatable cam on said carriage, a cam follower on the carriage engaging said cam and adapted to be displaced thereby in response to rotation of the cam, said cam follower when displaced actuating said mechanism to vary the speed of said motor and means responsive to arrival of the carriage at a predetermined point in advance of said predetermined station to initiate rotation of said cam at a speed proportional to the velocity of the carriage and in a direction determined by the direction of the travel of the carriage, said cam being designed such that the displacement of said cam follower decelerates the carriage to zero velocity when the carriage arrives at a position in alignment with said predetermined station.

4. The combination called for in claim 3, wherein said cam has an eccentric portion the throw of which is designed to displace said cam follower sufficiently to reverse the direction of rotation of the motor in the event the carriage coasts to a position beyond said position in alignment with said predetermined station.

5. The combination called for in claim 3, wherein the means for rotating said cam comprises a shaft on said carriage means for rotating the shaft at a speed proportional to the velocity of the carriage and in a direction determined by the direction of travel of the carriage, a clutch for coupling said shaft with said cam and means for engaging said clutch when the carriage arrives at said predetermined position in advance of said predetermined station.

6. The combination called for in claim 5, wherein said clutch is adapted to be electrically energized to engage and said last-mentioned means comprises a switch member and a switch-actuating member, one of said last-mentioned members being mounted on the carriage and the other on said base.

7. The combination called for in claim 6, wherein at least one of said last-mentioned members is adjustable in a direction parallel to the path of travel of the carriage so as to vary the position at which the clutch is engaged and thereby determine the position at which the carriage velocity is reduced to zero.

8. The combination called for in claim 3, including a second cam on the carriage, a cam follower engaged with said second cam, the last-mentioned cam follower also adapted when displaced to actuate said control mechanism to vary the speed of the carriage and means for initiating movement of said second cam in response to initiation of an indexing cycle of the carriage, said second cam follower when displaced by said second cam serving to increase the speed of the motor and thereby accelerate the carriage.

9. The combintion called for in claim 8, wherein said second cam is moved at a generally constant rate.

10. In combination, a base, means forming a plurality of stations spaced apart along said base. a carriage mounted for movement on the base for traversing said stations in opposite directions, a hydraulic motor-pump unit for driving said carriage on said base, said motor-pump unit being of the reversible, variable-speed type, so that the carriage can be driven in opposite directions on said base at a variable velocity, a mechanism for controlling the speed and direction of the motor of said unit, a shaft on said carriage, means for rotating the shaft in opposite directions related to the direction of travel of the carriage and at a speed proportional to the velocity of the carriage, a pair of rotatable cams on the carriage disposed in opposite relation, cam follower means associated with said cams and adapted to be displaced thereby when the cams are rotated, means interconnecting said cam follower means with said mechanism such that the displacement of said cam follower means by said cams produces a corresponding change in the velocity of the carriage, means for coupling said cams with said shaft to rotate therewith when the carriage arrives at a predetermined position in advance of a predetermined station at which it is desired to stop the carriage, said cam follower means being displaced by one of said cams when the carriage is travelling in one direction and by the other of said cams when the carriage is travelling in the opposite direction.

11. The combination set forth in claim 10, including means for normally retaining said cams in a position such that the velocity of the carriage is at a maximum value and wherein displacement of the cam follower means through a predetermined distance decelerates the carriage to zero velocity.

12. The combination set forth in claim 11, wherein said cams are designed such that displacement of said cam follower means beyond said predetermined distance produces a reversal of the output of the motor-pump unit and thereby reverses the direction of travel of the carriage.

13. The combination set forth in claim 10, wherein said cams are positioned axially adjacent one another and the cam follower means comprises a single cam follower engaging the periphery of both cams.

14. The combination set forth in claim 13, wherein each cam has an eccentric portion by means of which the cam follower is displaced when the cam is rotated, said eccentric portion of each cam extending around less than one-half of the periphery of the cam.

15. The combination set forth in claim 10, including a third cam on said carriage and a cam follower engaged therewith, said cam follower being interconnected with said mechanism such that displacement of the cam follower produces a proportional change in the velocity of the carriage and means for moving said third cam upon initiation of a carriage-indexing cycle.

16. The combination set forth in claim 15, wherein said third cam is normally positioned such that the carriage velocity is zero and wherein displacement of said cam follower by said third cam accelerates the carriage.

17. The combination set forth in claim 16, wherein said third cam comprises a linear cam and said means for moving said third cam comprises a piston-cylinder assembly adapted when actuated to shift the third cam in a linear path.

18. In a work-handling machine the combination including a base, means forming a plurality of stations spaced along said base, a carriage mounted for movement on the base past said stations, means for driving the carriage, carriage decelerating means adapted when energized to decelerate the carriage to zero velocity at a predetermined rate and means for stopping the carriage at a predetermined station comprising a sensor member and a sensor actuating member, one of said members being mounted on the carriage and the other on the base, said sensor member when actuated energizing said carriage decelerating means to initiate deceleration of the carriage, said sensor member and sensor actuating member being relatively positioned such that the actuating member trips the sensor member when the carriage arrives at a predetermined position in advance of a station at which it is desired to stop it, said predetermined position being determined by the rate at which the carriage is decelerated so that it will have zero velocity when it arrives at said station.

19. The combination set forth in claim 18, wherein said carriage decelerating means are electrically actuated.

20. The combination set forth in claim 18, wherein said sensor comprises a switch assembly.

21. The combination set forth in claim 20, wherein the switch actuating member and the switch assembly are relatively adjustable in a direction parallel to the path of travel of the carriage to permit adjustment of the position at which the carriage velocity is reduced to zero.

22. The combination set forth in claim 21, wherein said switch actuating member comprises a cam and said switch assembly includes a lever adapted to engage said cam when the carriage approaches said predetermined position, and a switch adapted to be actuated by said lever when the carriage arrives at said predetermined position.

23. The combination set forth in claim 22, wherein said switch includes a movable member for tripping the switch at a predetermined position of the movable member and means interposed between said lever and movable member and forming an operative connection therebetween, said last-mentioned means being adjustable for varying the relative positions of the lever and the cam at which the switch is tripped.

24. The combination set forth in claim 23, wherein said last-mentioned means comprises a screw extending between the lever and the movable member of the switch, the screw being adjustable to vary the distance between the lever and the movable member.

25. In combination a base, means forming a plurality of stations spaced apart along said base, a carriage mounted on said base for movement in a predetermined path past said stations, means for driving the carriage in opposite directions, electrically actuated means adapted when energized to decelerate the carriage to zero velocity at a predetermined rate and means for stopping the carriage at any desired station comprising a switch assembly and a plurality of cams, one cam for each station, said switch assembly and cams being mounted one on the carriage and the other on the base, said cams being spaced apart relative to each other corresponding to the relative spacing between said stations, said switch assembly when tripped energizing said electrically actuated means to initiate deceleration of the carriage, said cams each having two cam surfaces, one of said surfaces being operative for tripping said switch assembly when the carriage is travelling in one direction and the other being operative when the carriage is travelling in the opposite direction, said cams and switch assembly being relatively positioned such that when the carriage arrives at a predetermined position in advance of a station at which it is desired to stop the carriage, the switch assembly is tripped by the operative surface of the cam associated with said station, said predetermined position being located such that the carriage velocity is zero when it arrives at said last-mentioned station.

26. The combination set forth in claim 25, wherein said switch assembly comprises a switch having a movable member for tripping the switch, a lever adapted to engage the operative surfaces of said cams for actuating the movable member and means interposed between said lever and moveable member for varying the position of the lever relative to the operative surfaces of the cams at which the switch is tripped, so that the switch assembly is adjustable to stop the carriage at the same point in either direction of travel.

27. The combination set forth in claim 26, wherein the operative surfaces of all of said cams are of substantially identical shape and all of the cams are mounted on their respective support in the same position relative to said lever.

28. The combination set forth in claim 27, wherein said last-mentioned means comprises an adjusting screw on said lever engaging said movable member of the switch, said screw being adjustable to vary the distance between the movable member and the lever.

29. The combination set forth in claim 25, wherein said switch assembly comprises a switch having a movable member for tripping the switch, a lever adapted to engage the operative surfaces of the cams for actuating the movable member, said movable member normally engaging said lever, and a stop against which the lever is normally biased, said lever moving out of engagement with said stop in response to engagement with the operative surfaces of said cams to trip said switch.

30. The combination set forth in claim 29, wherein said stop is adjustable and positioned such that the switch is tripped in response to disengagement of the lever with said stop.

31. In a work-handling mechanism the combination of a base, means forming a plurality of stations spaced along said base, a carriage guided for movement on the base, means for driving the carriage, electrically actuated means for stopping the carriage at said stations and a transducer mechanism for actuating said electrically actuated means and for transmitting a signal indicating that the carriage has stopped at a desired station, comprising a pair of switch assemblies, a plurality of pairs of cams, one pair for each station, said switch assemblies and cams being mounted one on the carriage and the other on the base, said pairs of cams being spaced relative to one another to correspond with the relative spacing between the stations, the cams in each pair being juxtaposed and interconnected in fixed relation, one of said switch assemblies when actuated energizing said electrically actuated means and the other transmitting said signal, one of said cams actuating said one switch assembly when the carriage approaches a station at which it is desired to stop and the other cam actuating the other switch assembly when the carriage has stopped at said station.

32. The combination set forth in claim 31, wherein said electrically actuated means are designed when actuated to stop the carriage after the carriage has travelled a predetermined distance.

33. The combination set forth in claim 32, wherein the carriage drive means is adapted to drive the carriage in opposite directions and each cam has two oppositely disposed cam surfaces, one of said cam surfaces being operative when the carriage is travelling in one direction and the other being operative when the carriage is travelling in the opposite direction to trip said switch assemblies.

34. The combination set forth in claim 33, wherein each switch assembly comprises a switch having a movable member thereon for tripping the switch and a lever adapted to engage one of the cams to shift the movable member and thereby trip its respective switch.

35. The combination set forth in claim 34, wherein each switch includes means for varying the point on the operative surface of the cam at which its associated switch is tripped.

36. The combination set forth in claim 35, wherein said last-mentioned means comprises means interposed and forming an operative connection between each lever and its associated movable member which is adjustable in length.

37. The combination set forth in claim 35, wherein said last-mentioned means comprises a screw adjustably threaded on each lever.

38. The combination set forth in claim 35, including a stop against which each lever is normally biased, each cam being adapted when engaged by its respective lever to pivot the lever away from its respective stop and shift the movable member in the switch-tripping direction.

39. The combination set forth in claim 35, including a stop for each lever, means biasing each lever into engagement with its stop to determine the normal position of the lever when out of engagement with its respective cam, said stop being adjustable to vary said normal position of said levers, said levers when engaged by their respective cams moving out of engagement with their stops in the switch-tripping direction.

40. The combination set forth in claim 39, wherein each stop is adjustable to a position wherein its associated switch is tripped in response to movement of its associated lever out of contact with the stop.

41. The combination set forth in claim 39, wherein said other switch assembly is bodily adjustable relative to said one switch assembly.

42. The combination set forth in claim 41, wherein all of the cams associated with one switch assembly are of substantially identical shape and wherein all of the cams associated with the other switch assembly are of substantially identical shape.

43. The combination set forth in claim 42, wherein each pair of cams is bodily shiftable as a unit relative to the other pairs of cams.

44. The combination set forth in claim 43, wherein the two operative surfaces of each cam are symmetrical about a center line extending perpendicular to the path of travel of the carriage.

45. The combination set forth in claim 43, including a support plate on which each pair of cams is mounted, said support plate having groove means therein extending parallel to the path of travel of the carriage, each pair of cams being mounted in said groove means for adjustment therealong.

46. The combination set forth in claim 45, wherein said groove means comprise registering grooves in opposite faces of the support plate, the cams in each pair being mounted one adjacent each of said opposite faces, each cam having a pair of sockets therein, bearing balls in said sockets engaging said grooves and means clamping the cams and bearing balls within the grooves.

47. In a work-handling mechanism of the type including a base, means forming a plurality of stations spaced apart adjacent the base, a carriage mounted for movement on the base for traversing said stations, a variable speed motor unit for driving said carriage on the base and means for decelerating the carriage to zero velocity when the carriage arrives at a position in alignment with a predetermined station comprising a mechanism adapted to control the speed of said motor unit, a movable cam, a cam follower engaging said cam and adapted to be displaced thereby in response to movement of the cam, said cam follower when displaced actuating said mechanism to vary the speed of the motor and means responsive to the arrival of the carriage at a predetermined point in advance of said predetermined station to initiate movement of said cam at a speed proportional to the velocity of the carriage, said cam being shaped such that displacement of the cam follower decelerates the carriage to zero velocity when the carriage arrives at a position in alignment with said predetermined station.

48. The combination called for in claim 47, wherein said motor unit is of the reversible type and wherein said cam has an eccentric portion the throw of which is designed to displace the cam follower sufficiently to reverse the direction of operation of the motor unit in the event the carriage travels to a position beyond said position in alignment with said predetermined station.

49. The combination called for in claim 47, including a second cam on the carriage, a cam follower engaged with said second cam, the last-mentioned cam follower also being adapted when displaced to actuate said control mechanism to vary the speed of the carriage, means for initiating movement of the second cam in response to initiation of a carriage indexing cycle, said second cam follower when displaced serving to increase the speed of the motor unit and thereby accelerate the carriage.

50. The combination called for in claim 49, wherein the first cam is normally positioned such that the carriage velocity is at a maximum value and displacement of the first cam follower decelerates the motor unit and the second cam is normally positioned such that the carriage velocity is zero and displacement of the second cam follower accelerates the motor unit.

References Cited

UNITED STATES PATENTS 3,031,902  5/1962  Parske et al. _____ 74—821 XR
3,094,207  6/1963  Millhiser et al. _____ 198—209
3,412,633  11/1968  Huntley _____ 74—821

FRED C. MATTERN, JR., Primary Examiner

F. D. SHOEMAKER, Assistant Examiner

U.S. Cl. X.R.

74—821, 822; 198—19